US 10,746,882 B2

(12) United States Patent
Lennen

(10) Patent No.: US 10,746,882 B2
(45) Date of Patent: Aug. 18, 2020

(54) GNSS RECEIVER PERFORMANCE IMPROVEMENT VIA LONG COHERENT INTEGRATION

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 286 days.

(21) Appl. No.: 15/965,013

(22) Filed: Apr. 27, 2018

(65) Prior Publication Data

US 2019/0257954 A1    Aug. 22, 2019

Related U.S. Application Data

(60) Provisional application No. 62/633,317, filed on Feb. 21, 2018.

(51) Int. Cl.
*G01S 19/37*  (2010.01)
*G01S 19/22*  (2010.01)
*G01S 19/21*  (2010.01)

(52) U.S. Cl.
CPC .............. *G01S 19/37* (2013.01); *G01S 19/21* (2013.01); *G01S 19/22* (2013.01)

(58) Field of Classification Search
CPC ........ G01S 19/37; G01S 19/21; G01S 19/215; G01S 19/22; G01S 19/30; G01S 19/32; G01S 19/36
USPC .................................................... 342/357.59
See application file for complete search history.

(56) References Cited

U.S. PATENT DOCUMENTS

| 6,160,841 | A  | 12/2000 | Stansell, Jr. et al. |
| 7,586,980 | B2 |  9/2009 | Kim |
| 7,639,181 | B2 | 12/2009 | Wang et al. |
| 8,305,268 | B2 | 11/2012 | Lennen |
| 9,291,717 | B2 |  3/2016 | Lennen |
| 9,482,760 | B2 | 11/2016 | Lennen |
| 9,784,845 | B2 | 10/2017 | Lennen |

(Continued)

FOREIGN PATENT DOCUMENTS

CN        105527631 A      4/2016

OTHER PUBLICATIONS

Petovello, Mark, GNSS Solutions: Multipath vs. NLOS signals, How Does Non-Line-of-Sight Reception Differ from Multipath Interference, Inside GNSS, Nov./Dec. 2013, pp. 40-44.

(Continued)

*Primary Examiner* — Harry K Liu
(74) *Attorney, Agent, or Firm* — The Farrell Law Firm, P.C.

(57) ABSTRACT

Systems, methods and apparatuses for generating long coherent integrations of received global navigation satellite system (GNSS) signals are described. One method includes generating coherent 1 second I/Q correlations by at least two stages of summation starting with 1 millisecond correlated I/Q signal samples. Intermediate stage coherent I/Q correlations may be modified based on, for example, lack of carrier phase lock and/or the carrier signal-to-noise density ($C/N_0$). Such modifications include phase rotation. Energy/power amplitudes calculated from the coherent 1 second I/Q correlations may be used for improving multipath mitigation, the signal-to-noise ratio (SNR), and other GNSS receiver operations and functions.

20 Claims, 12 Drawing Sheets

(56) References Cited

U.S. PATENT DOCUMENTS

| | | | |
|---|---|---|---|
| 2006/0209935 A1* | 9/2006 | Abraham | G01S 19/24 375/150 |
| 2008/0112469 A1* | 5/2008 | Goldberg | G01S 19/24 375/150 |
| 2017/0234987 A1 | 8/2017 | Wei et al. | |

OTHER PUBLICATIONS

The Cabinet Office, Government of Japan ("CAO") and Quasi-Zenith Satellite Systems Services Inc., Quasi-Zenith Satellite System Interface Specification Satellite Positioning, Navigation and Timing Service, Mar. 28, 2017, 148 pages.

Indian Space Research Organization, Indian Regional Navigation Satellite System, Signal in Space ICD for Standard Positioning Service, Version 1.1, Aug. 2017, 72 pages.

European GNSS (Galileo) open service, Signal in space Interface Control Document, European Union 2016, version 1.3, Dec. 2016, 88 pages.

Global positioning systems directorate systems engineering & integration—Interface specification IS-GPS-800D, Navstar GPS Space Segment/User Segment L1C Interface, Sep. 24, 2013, 127 pages.

Global Navigation Sattelite System, Glonass, Interface Control Document, Navigational radiosignal in bands L1, L2, (Edition 5.1) Moscow 2008, 65 pages.

BeiDou navigation satellite system—Signal in space interface control document, Open service signal B1I, China Satellite Navigation Office, version 1.0, Dec. 2012, 81 pages.

Bhuiyan, Mohammad Zahidul H. et al.,Multipath Mitigation Techniques for Satellite-Based Positioning Applications, Global Navigation Satellite Systems, Signal, Theory and Applications, Chapter 17, InTech, pp. 405-426.

Ward, Phillip W., Satellite signal acquisition, tracking, and data demodulation, chapter 5, Understanding GPS principles and applications (2nd Ed., 2005), pp. 153-241.

Global positioning systems directorate systems engineering & integration—Interface Specification IS-GPS-200H, Naystar GPS Space Segment/Navigation User Interfaces, Sep. 24, 2013, 226 pages.

* cited by examiner

Note: FFT/carrier rotator not needed so far in tests.
AFC keeps carrier frequency close enough.

US 10,746,882 B2

GNSS RECEIVER PERFORMANCE IMPROVEMENT VIA LONG COHERENT INTEGRATION

PRIORITY

This application claims priority under 35 U.S.C. § 119(e) to U.S. Provisional Patent Application Ser. No. 62/633,317 filed on Feb. 21, 2018, the entire disclosure of which is incorporated herein by reference.

FIELD

The present disclosure relates generally to navigation systems, and more particularly, to providing performance improvement in global navigation satellite system (GNSS) receivers via long coherent integration.

BACKGROUND

Satellite navigational systems provide positional and timing information to earth-bound receivers, sometimes referred to as position, velocity, and timing (PVT) and/or position, navigation, and timing (PNT) measurements. Each system has its own constellation of satellites orbiting the Earth, and, in order to calculate its position, a receiver on Earth uses the satellites "in view" (i.e., in the sky above) from that system's constellation. A global navigational satellite system (GNSS) is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

SUMMARY

According to one aspect of the present disclosure, a method is provided for a global navigation satellite system (GNSS) receiver, including generating first coherent in-phase (I) correlations and first coherent quadrature (Q) correlations by summing coherent complex signal samples over a first time period; generating second coherent I correlations and second coherent Q correlations by summing the generated first coherent I correlations and the generated first coherent Q correlations over a second time period longer than the first time period; if there is no carrier phase lock, phase-rotating the second coherent I correlations and the second coherent Q correlations to align the second coherent I correlations and the second coherent Q correlations to a common reference plane; and generating third coherent I correlations and third coherent Q correlations by summing the generated second coherent I correlations and the generated second coherent Q correlations over a third time period longer than the second time period.

According to another aspect of the present disclosure, an apparatus is provided, which includes one or more non-transitory computer-readable media; and at least one processor which, when executing instructions stored on one or more non-transitory computer readable media, performs the steps of generating first coherent in-phase (I) correlations and first coherent quadrature (Q) correlations by summing coherent complex signal samples over a first time period; generating second coherent I correlations and second coherent Q correlations by summing the generated first coherent I correlations and the generated first coherent Q correlations over a second time period longer than the first time period; if there is no carrier phase lock, phase-rotating the second coherent I correlations and the second coherent Q correlations to align the second coherent I correlations and the second coherent Q correlations to a common reference plane; and generating third coherent I correlations and third coherent Q correlations by summing the generated second coherent I correlations and the generated second coherent Q correlations over a third time period longer than the second time period.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
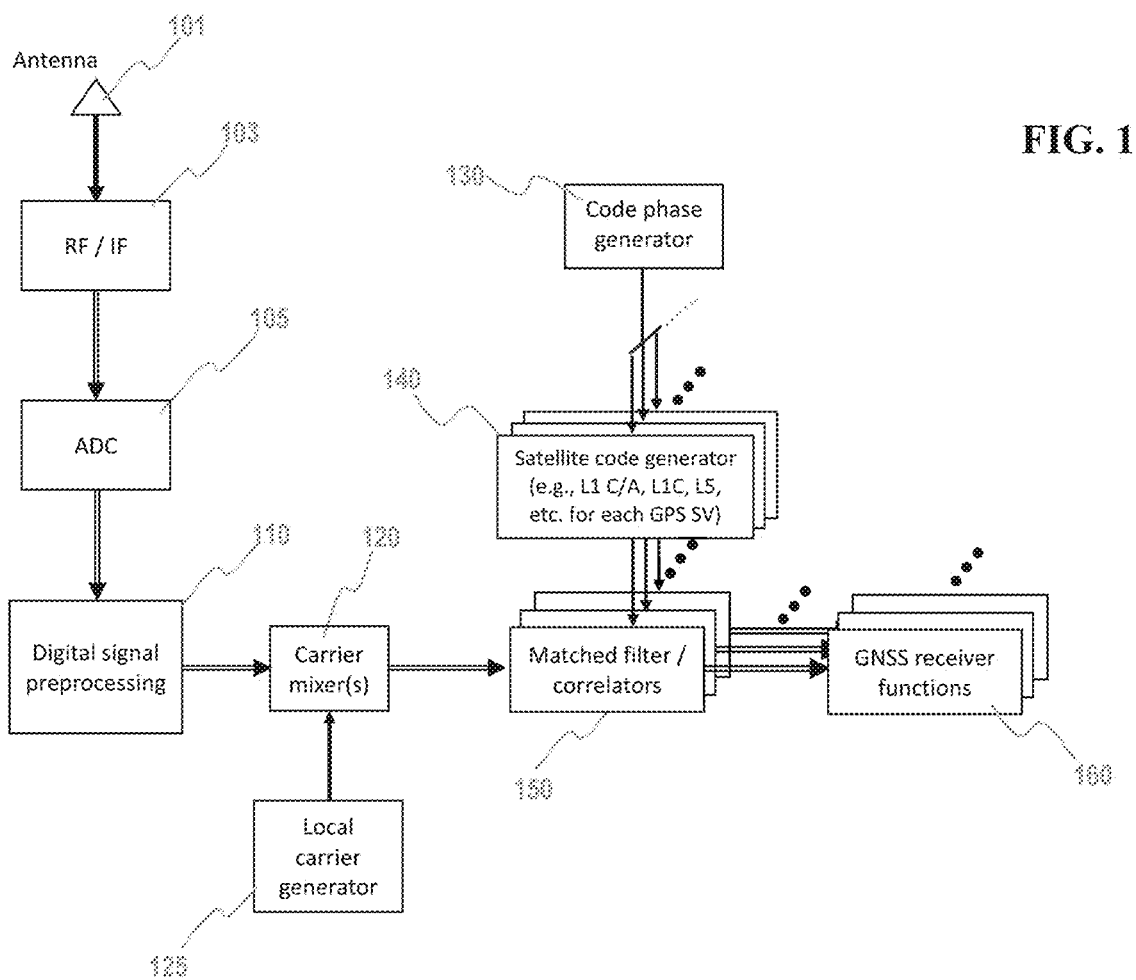
FIG. 1 illustrates an exemplary block diagram of the present GNSS receiver, according to an embodiment.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope of the present disclosure. In addition, descriptions of well-known functions and constructions are omitted for clarity and conciseness.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

The number of GNSS systems, both planned and presently operational, is growing. These include the global positioning system (GPS) of the United States, Russia's GLObalnaya NAvigatsionnaya Sputnikovaya Sistema (GLONASS), Europe's Galileo system, and China's BeiDou systems—each of which has, or will have, its own constellation of satellites orbiting the entire globe. Regional systems (those that are not global, but intended to cover only a certain region of the globe) include Japan's Quasi-zenith satellite system (QZSS) and the Indian regional navigational satellite system (IRNSS) also currently being developed. Satellite-based augmentation systems (SBASs), which are normally regional as well, "augment" existing GNSS systems with, e.g., messages from ground-based stations and/or additional navigational aids, are also continually developing and expanding.

On the receiving side, GNSS capabilities are no longer limited to any particular type of system or device. A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. Moreover, multi-constellation GNSS receivers are being developed which receive signals from more than one satellite constellation (e.g., two or more of GPS, Galileo, GLONASS, BeiDou, regional systems, and/or augmentation system constellations) and provide much greater accuracy because the number of unblocked satellites, sometimes referred to as satellite/space vehicles (SVs), overhead at any time from several constellations is always greater than the number of SVs overhead from a single constellation.

The term "GNSS receiver" as used herein, covers any such implementation of GNSS capabilities in a device or system.

The present disclosure is generally related to GNSS receivers. In particular, the present disclosure is related to a system and method for improving GNSS receiver performance using long coherent integration periods.

According to one aspect of the present disclosure, a system and method is provided for long coherent integration in a GNSS receiver. The present system and method generates 100 milliseconds (msecs) coherent in-phase (I) and quadrature (Q) correlations via summation of 20 msec I/Q correlations. If the system/method has carrier phase lock, the system/method performs data stripping of 100 msec I/Q correlations or performs data decoding if there is a strong carrier-to-noise density (C/No; hereinafter also referred to as "CNO") to generate processed 100 msec I/Q correlations. If the system/method has no carrier phase lock, the system/method performs data stripping of 100 msec I/Q correlations or data decoding, determines the respective angles between each I and corresponding Q correlation, phase-rotates each 100 msec I/Q correlation by the respective angle to align each 100 msec I/Q correlation to a common reference plane and generates processed 100 msec I/Q correlations. Finally, the present system/method generates 1 sec I/Q correlations by summing the generated 100 msec I/Q correlations.

Typically, a GNSS receiver performs signal accumulation by using both coherent and non-coherent integrations. For example, 20 msec of coherent processing may be followed by 1 second of non-coherent processing. Coherent accumulation results in an increased signal-to-noise ratio (SNR) in comparison with non-coherent accumulation. For example, coherent integration provides +3 dB increase in SNR per doubling in observation time whereas non-coherent integration provides a +1.5 dB increase for a doubling in observation time. Therefore, coherent accumulation is preferable from an increased SNR perspective.

Typically, 20 msec coherent I and Q values are generated via the summation of 1 msec I and Q correlations, as shown in Equation (I) below:

$$I_{20\ msec} = \Sigma_{1\ldots20} I_{1\ msec}$$

$$Q_{20\ msec} = \Sigma_{1\ldots20} Q_{1\ msec} \quad (1)$$

where the resulting coherent values $I_{20\ msec}$ and $Q_{20\ msec}$ then form a single non-coherent summation (NCS) for that 20 msec interval, as shown in Equation (2) below:

$$NCS_{20\ msec} = \sqrt{(I_{20\ msec} + Q_{20\ msec})} \quad (2)$$

and then the single non-coherent values for each 20 msec interval are summed over a second to generate the 1 second non-coherent sum $NCS_{1\ sec}$, as shown in Equation (3) below:

$$NCS_{1\ sec} = \Sigma_{1\ldots50} NCS_{20\ msec} \quad (3)$$

As another example, a typical receiver may coherently integrate for 20 msecs then accumulate the coherently integrated 20 msecs correlations non-coherently for approximately 5 seconds to achieve signal detection at a CNO≤15 dB-Hz. However, for signals in urban canyon environments to be useful, their CNO must range mainly above 15 dB-Hz. GNSS signal acquisition and/or tracking with correlated signals having a CNO<13 dB-Hz are of limited value in terms of generating accurate PVT results.

Data bit stripping is typically required to coherently integrate for periods more than 20 msecs. Modern GNSS signals (e.g., L1-C, E1-C) include pilot channels with known secondary codes, where data stripping is easily implemented. In future receivers, data stripping of signals may be a normal operation as such pilot signals become more available. Moreover, when the CNO is high enough to determine raw data bits in real time, data stripping is not necessarily required for coherent integration.

As would be understood by one of ordinary skill in the art, extending the time periods of coherent integration may have many benefits, including, but not limited to, improved SNR, improved information concerning SNR, improved impairment metrics (e.g., continuous wave (CW) detection, cross correlation detection), and improved performance of existing multipath mitigation algorithms (e.g., high resolution correlator (HRC) or multipath elimination technology (MET)). Moreover, the resulting narrowing of detection bandwidth creates opportunities for new multipath mitigation algorithms, as discussed more fully below.

However, three impairments usually prevent long coherent integration. First, because the frequency vs. amplitude relationship for coherent integration is a sinc function, longer coherent integration times reduces the frequency bin width. For example, the sinc function for 20 msec coherent integration has a ±50 Hz main lobe width, while the sinc function for 1 second coherent integration reduces the main lobe width to ±1 Hz-thus, when the GNSS receiver drifts outside this range, the CNO of the correlated signal may be greatly reduced.

Second, the generator of the local carrier signal in many GNSS receivers use a temperature compensated crystal oscillator (TCXO), which generates phase noise resembling a random walk in behavior, and thus causes the phase of the locally generated carrier to drift unpredictably with respect to the incoming satellite signal. With current TCXO technology, this limits the coherent integration period to around 100 msecs before the GNSS receiver suffers ≈0.5-1 dB CNO loss.

Third, GNSS receiver conditions/environment may prevent long coherent integration. For example, the Global Positioning System (GPS) L1 band signal has a wavelength of ≈19 cms (at carrier frequency 1575.42 MHz). The GNSS receiver does not need to move much to cause a phase rotation equal in magnitude to a substantial portion of the GPS L1 signal wavelength (e.g., moving 5 cms in 100 msecs causes a ≈90° carrier phase shift and thus significant CNO loss)

It is further noted that the present disclosure is described with respect to GPS L1 C/A code with data bit stripping. The present system operates on an individual satellite by satellite basis.

Although some of the description below uses GPS signals as examples, the present disclosure is not limited thereto, and multiple other embodiments are possible, some of which are mentioned herein, including, for example, application to the BeiDou signal codes, the Galileo E1 signal codes, and/or the QZSS L1C signal codes. For more detailed descriptions of some, but not all, GNSS signals, including regional systems, to which embodiments of the present disclosure are applicable, see, e.g., Global positioning systems directorate systems engineering & integration—Interface specification IS-GPS-200H (Sep. 24, 2013), describing the GPS L1 C/A, L2C, and P channels/codes (hereinafter referred to generally as "IS-GPS-200"); Global positioning systems directorate systems engineering & integration—Interface specification IS-GPS-800D (Sep. 24, 2013), describing the GPS L1C channel/code (hereinafter referred to generally as "IS-GPS-800"); Global navigation satellite system—GLONASS—Interface control document-Navigational radio signal in bands L1, L2 (Edition 5.1) (2008) (hereinafter referred to generally as "GLONASS L1,L2 ICD"); European GNSS (Galileo) open service—Signal in space interface control document (version 1.3) (2016) (hereinafter referred to generally as "Galileo OS-SIS-ICD"); BeiDou navigation satellite system—Signal in space interface control document—Open service signal B1I (version 1.0) (December 2012) (hereinafter referred to generally as "BeiDou ICD"); Quasi-zenith satellite system—Interface specification—Satellite positioning, navigation and timing service (hereinafter referred to generally as "IS-QZSS-PNT-001"); and Indian regional navigation satellite system—Signal in space ICD for standard positioning service (version 1.1) (hereinafter referred to generally as "ISRO-IRNSS-ICD-SPS-1.1"), all of which are incorporated herein by reference in their entirety.

Moreover, embodiments of the present disclosure are equally applicable to GNSSs assisted or augmented by SBASs, such as wide area augmentation system (WAAS), European geostationary navigation overlay service (EGNOS), multi-functional satellite augmentation system (MSAS), GPS aided geo augmented navigation (GAGAN), and the "assisted" GNSS (A-GNSS) technology being developed for, e.g., measurement/testing of signals in cellular telecommunication systems (see $3^{rd}$ generation partnership project (3GPP) technical specification 3GPP TS 37.571: Universal terrestrial radio access (UTRA) and evolved UTRA (E-UTRA) and evolved packet core (EPC); user equipment (UE) conformance specification for UE positioning, which has five parts, all of which are incorporated herein by reference).

Accordingly, one of ordinary skill in the art would recognize the applicability of the present disclosure to a variety of signals from any global or regional GNSS, whether augmented/assisted or not. Moreover, and as also would be understood by one of ordinary skill in the art, "channels," "bands," and "codes" may sometimes be used herein interchangeably, as many GNSS signals are transmitted on the same channel (i.e., same frequency, same time) or band (i.e., frequency bandwidth), but with different codes, which effectively makes them different "channels," in the more general sense of the term.

According to one embodiment, the present system may use any phase coherence available to enable very long coherent integration times. According to one embodiment, the present system uses 1 second coherent integration. This length of coherent integration is particularly suitable because of its relationship to positioning at a 1 Hz rate and nominal metric compute rate. However, coherent integration according to embodiments of the present disclosure may be extended indefinitely under certain scenarios (or shortened to periods <1 second, e.g., 0.5, 0.25 seconds). Coherently tracked signals include GPS L1 C/A code≥26.0 dB-Hz, Galileo E1-C≥20 dB-Hz, GPS L1 CIA code ≥20 dB-Hz with data stripping, plus many other signals in other systems. According to one embodiment, the present system may perform indefinite coherent integration when carrier phase lock is not present using a rotate phase process (also referred to herein as "RPA") as described below. RPA can allow long coherent integration to operate down to a CNO of ≈17 dB (with data stripping).

As mentioned above, the coherent integration period according to embodiments of the present disclosure may be varied, for example, from 20 msec to 20 seconds or more. Table 1 below shows the associated SNR gain using the present technique vs. a typical scheme that has a 20 msec coherent integration period followed by a second non-coherent period. As shown in Table 1, using a 1 second coherent process provides a +8.5 dB SNR improvement over the typical combination coherent/non-coherent process.

TABLE 1

| Coherent period (seconds) | SNR improvement (dBs) |
|---|---|
| 0.02 | 0.0 |
| 0.1 | 3.5 |
| 0.5 | 7.0 |
| 1 | 8.5 |
| 2 | 10.0 |
| 5 | 12.0 |
| 10 | 13.5 |

According to one embodiment of the present disclosure, the present system/method takes different actions based on the current CNO.

When there is strong CNO (≥26 dB-Hz), long coherent integration can be implemented in a number of ways according to embodiments of the present disclosure. For example, assuming the phase locked loop (PLL) is a Costas loop, it presumably has full carrier phase lock, because of the strong signal (limited by the data modulation presence), thus neither data stripping nor a RPA need be applied to the signal and real time decode could be used. In such a case, however, extra dB headroom would likely be required to prevent the Costas loop from adding excessive phase noise over the long integration period. As another example, there could be no Costas loop carrier phase lock, and data stripping combined with the RPA process is used to implement long coherent integration. Indeed, as yet another example, based on the signal strength, there may be no data stripping or phase lock requirement, but rather only usage of the RPA process to implement long coherent integration. Based on the present disclosure, the full range of possibilities would be apparent to one of ordinary skill in the art.

When there is medium CNO (26 dB-Hz>CNO≥20 dB-Hz), long coherent integration can be implemented a number of ways according to embodiments of the present disclosure. For example, a PLL is usually better for medium CNO than a Costas loop, typically 6 dB better at carrier phase locking than a Costas loop. As another example, a Costas loop combined with data stripping could be sufficient to implement long coherent integration. However, a Costas loop is typically used when there is stronger CNO, as indicated above, and when there is unknown data on the signal (e.g., 50 Baud data). When there are pilot signals with known data, a PLL can be used with data stripping. A Costas loop locks to a modulo ½ carrier cycle, while a PLL locks to a modulo 1 carrier cycle. One of the main reasons why GNSS satellite signals are adopting pilot signals is so a PLL can be used by GNSS receivers.

Once again, extra dB headroom would likely be required to prevent the Costas loop from adding excessive phase noise over the long integration period. If the GNSS signal is a pilot signal with a secondary code, this would further strengthen the data stripping process, as discussed above. As another example, the RPA process could be used with data stripping, but without a PLL lock requirement. Based on the present disclosure, the full range of possibilities would be apparent to one of ordinary skill in the art.

When there is weak CNO (20 dB-Hz>CNO≥≈7 dB-Hz), no Costas/PLL lock may be possible (and thus also not required), but rather carrier automatic frequency control (AFC) loops may be used in combination with the RPA process to implement long coherent integration. Based on the present disclosure, the other possibilities in weak signal environments would be apparent to one of ordinary skill in the art.

According to an embodiment of the present disclosure, when there is a strong signal and good carrier phase lock is assumed, a 1 second coherent integration period is achieved by summing the individual I and Q correlations across 1 second. For strong signals, the carrier phase tracking loop essentially tracks any TCXO phase motion and user dynamics. For signals that are data stripped, a PLL (phase locked loop) can be used to track the carrier (instead of a Costas loop). This allows the track threshold to be 6 dB better, allowing coherent summation down to ≥20 dB-Hz. Thus the coherent accumulation is performed by summing I and Q directly across 1 second. Thus, for example, under these conditions, 20 msec coherent I and Q values are generated via the summation of 1 msec I and Q correlations, as shown in Equation (4) below:

$$I_{20\ msec} = \Sigma_{1\ \ldots\ 20} I_{1\ msec}$$

$$Q_{20\ msec} = \Sigma_{1\ \ldots\ 20} Q_{1\ msec} \quad (4)$$

where the resulting coherent values $I_{20\ msec}$ and $Q_{20\ msec}$ are then coherently integrated to produce 100 msec coherent values, as shown in Equation (5) below:

$$I_{100\ msec} = \Sigma_{1\ \ldots\ 5} I_{20\ msec}$$

$$Q_{100\ msec} = \Sigma_{1\ \ldots\ 5} Q_{20\ msec} \quad (5)$$

and then the coherent values $I_{100\ msec}$ and $Q_{100\ msec}$ are coherently integrated over a second to generate 1 second coherent sums $I_{1\ sec}$ and $Q_{1\ sec}$, as shown in Equation (6) below:

$$I_{1\ sec} = \Sigma_{1\ \ldots\ 10} I_{100\ msec}$$

$$Q_{1\ sec} = \Sigma_{1\ \ldots\ 10} Q_{100\ msec} \quad (6)$$

According to another embodiment of the present disclosure, when there is a weak signal (20 dB-Hz>CNO≥≈17 dB-Hz) and no carrier phase lock, the present system/method uses an RPA process. More specifically, a standard AFC process is used to track offset frequency and the RPA process makes phase adjustments on its own without using a PLL. Thus, for example, under these conditions, the present system/method starts again by generating 20 msec coherent I and Q values via the summation of 1 msec I and Q correlations, as shown in Equation (7) below:

$$I_{20\ msec} = \Sigma_{1\ \ldots\ 20} I_{1\ msec}$$

$$Q_{20\ msec} = \Sigma_{1\ \ldots\ 20} Q_{1\ msec} \quad (7)$$

where the resulting coherent values $I_{20\ msec}$ and $Q_{20\ msec}$ are then coherently integrated to produce 100 msec coherent values, as shown in Equation (8) below:

$$I_{1000\ msec} = \Sigma_{1\ \ldots\ 5} I_{20\ msec}$$

$$Q_{100\ msec} = \Sigma_{1\ \ldots\ 5} Q_{20\ msec} \quad (8)$$

and then the coherent values $I_{100\ msec}$ and $Q_{100\ msec}$ are processed by an RPA to generate modified coherent values $I^*_{100\ msec}$ and $Q^*_{100\ msec}$ (as discussed in further detail below), as shown in Equation (9) below:

$$I^*_{100\ msec} = RPA(I_{100\ msec})$$

$$Q^*_{100\ msec} = RPA(Q_{100\ msec}) \quad (9)$$

and these modified coherent values $I^*_{100\ msec}$ and $Q^*_{100\ msec}$ are coherently integrated over a second to generate 1 second coherent sums $I_{1\ sec}$ and $Q_{1\ sec}$, as shown in Equation (10) below:

$$I_{1\ sec} = \Sigma_{1\ \ldots\ 10} I^*_{100\ msec}$$

$$Q_{1\ sec} = \Sigma_{1\ \ldots\ 10} Q^*_{100\ msec} = 0 \quad (10)$$

Although 100 msec intervals are used in Equation (9) in the example above, the input to the RPA process may be coherently integrated I and Q signals from 40 to 140 msecs, depending on how long the local carrier generator allows coherent integration before accumulating too much CNO loss from phase noise. As shown by Equation (10), when there is full carrier phase lock simulated by the RPA process, the energy in the Q correlator is minimized and in turn the energy in the I channel is maximized.

FIG. 1 illustrates an exemplary block diagram of the present GNSS receiver, according to an embodiment. Only components of the receive chain of a GNSS receiver pertinent to embodiments of the present disclosure are shown/discussed herein. For more details regarding components in a GNSS receive chain, see, e.g., Ward et al., *Satellite signal acquisition, tracking, and data demodulation*, chapter 5, Understanding GPS principles and applications ($2^{nd}$ Ed., 2005), Kaplan and Hegarty, eds. (Artech House); IS-GPS-200; IS-GPS-800; and U.S. Pat. Nos. 9,482,760; 9,291,717; 8,305,268; and 9,784,845, all by the present inventor; all of which are incorporated by reference in their entirety.

In FIG. 1, the GNSS signals received by antenna 101 are processed by radio frequency (RF)/intermediate frequency (IF) block 103, that amplifies, filters, and outputs a complex IF analog signal. The double lines connecting the boxes in FIG. 1 represent the fact that the signals being processed are complex, i.e., having both an in-phase (I) and quadrature (Q) components. Analog-to-digital converter (ADC) 105 receives the IF analog signal output by RF/IF block 103 and converts it into a digital signal for further processing in the digital domain by digital signal preprocessing block 110. Among other functions, digital signal preprocessing block 110 detects and removes interfering signals and, in a multi-GNSS embodiment, separates the GNSS signals into their individual systems. For example, digital signal preprocessing block 110 separates GPS signals from the GLONASS signals.

The signals output from digital signal preprocessing block 110 are input into carrier mixer 120, which translates the input signals to baseband signals by mixing the input signals with signals output from local carrier frequency generator 125. As would be understood by one of ordinary skill in the art, signal tracking procedures (typically implemented in software) may form a carrier frequency tracking discriminator from the correlations later in the receive chain and apply a loop filter to provide feedback to the local carrier frequency generator 125.

The baseband signals output from carrier mixer 120 are input into matched filter/correlators 150, which correlate the baseband signals with individual satellite codes, thereby outputting sets of correlated signals for each satellite signal. The individual satellite codes used for correlation are fed from code generator(s) 140, which, using GPS as an example, generates L1 C/A, L1C, L5, etc., signal codes for each of the 37 GPS satellites, in order that each of the matched filter(s)/correlator(s) 150 will attempt to correlate with those GPS signals. Satellite code generator(s) 140 is driven by code phase generator 130. Similar to the carrier frequency tracking discussed in reference to (local) carrier mixer 120 and local carrier frequency generator 125 above, and as would be understood by one of ordinary skill in the art, code correlating/tracking procedures (typically implemented in software) form a code tracking discriminator function that is further filtered to generate a feedback code phase shift estimate to code phase generator 130, which may include, for example, the previously-discussed TXCO, which serves as the source clock for the components, such as code phase generator 130, local carrier generator 125, etc., in the receive chain.

Matched filter/correlators 150 typically outputs I and Q values at rates from less than 1 msec to 10 msec or more. The longer time that is taken by matched filters/correlators 150, the more coherent the summation output becomes. The I and Q outputs of matched filters/correlators 150 are themselves coherent integrations.

The correlated signals output by matched filter/correlators 150 are fed into many GNSS receiver functions 160, each of which has its own requirements in terms of integration periods, coherent vs. non-coherent integration, time domain vs. frequency domain manipulation, etc., as would be understood by one of ordinary skill in the art. As specific examples concerning integration, data demodulation for GPS L1 C/A uses 20 msec I and Q coherent integration while CW detection uses 20 msec coherent integration followed by non-coherent integration of between 100 msec and 20 secs. RPA also has its own specific requirements for the input coherent integration period which, as described elsewhere in the present disclosure, could be from 40 msec to 200 msec or more.

Figure 2:
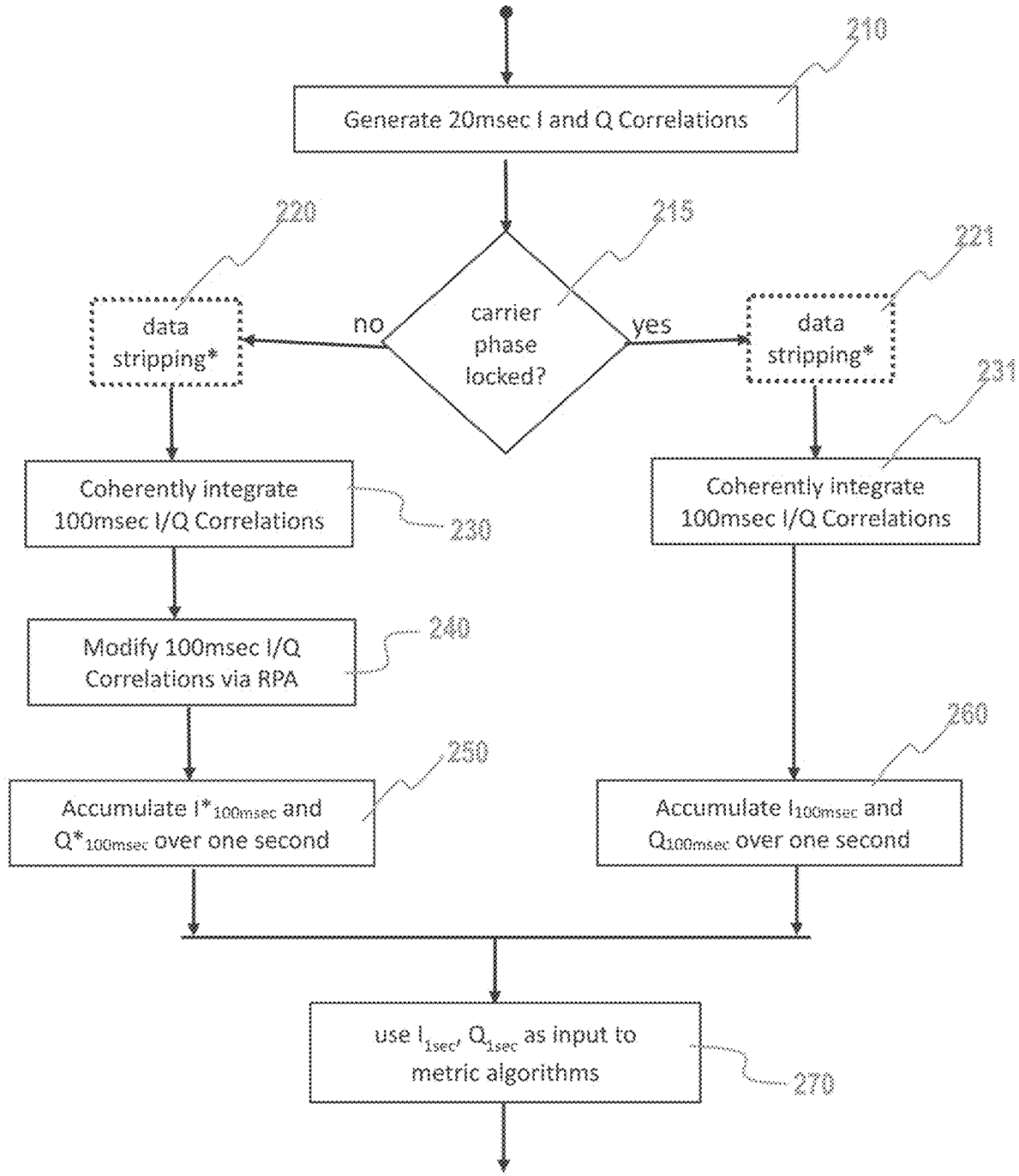
FIG. 2 illustrates an exemplary flowchart of a method according to an embodiment.

FIG. 2 illustrates an exemplary flowchart of a method according to an embodiment of the present disclosure. At 210, the present system/method starts by generating 20 msec coherent I and Q values via the summation of 1 msec I and Q correlations, as shown in Equations (4) and (7) above. At 215, the present system/method determines whether the carrier phase is adequately locked. Although the carrier phase lock is checked in this embodiment, in other embodiments, as discussed above, the CNO level may determine the next steps taken, or both.

At 220 and 221, the present system/method may perform the optional data stripping and/or data decoding operations. In many cases, the present system/method will perform data stripping at 220/221 to offset the errors caused by the lack of carrier phase lock. However, since it may not be absolutely necessary, the present system/method performing data strip/data decoding 220/221 is still shown as optional in FIG. 2. The present system/method performs coherent integration at 230 and 231 in the same manner, as shown by Equations (5) and (8), to generate the coherent $I_{100\ msec}$ and $Q_{100\ msec}$ values.

However, in the embodiment of FIG. 2, because there is no carrier phase lock in the left-hand path, the present system/method modifies the coherent $I_{100\ msec}$ and $Q_{100\ msec}$ values generated at 230 by the RPA process at 240, as shown by Equation (9) above, unlike the right-hand path, where there is carrier phase lock. The present system/method sums, at 250, the modified coherent $I^*_{100\ msec}$ and $Q^*_{100\ msec}$ values output at 240, as shown by Equation (10) above, in a similar manner to the summation at 260, as shown by Equation (6) above, of the unmodified coherent $I_{100\ msec}$ and $Q_{100\ msec}$ values generated at 231.

At 270, the present system/method uses long coherent $I_{1\ sec}$ and $Q_{1\ sec}$ values generated at 250 or 260 for metrics of the operations of the GNSS receiver. Examples of this are discussed further below, in regards to multipath mitigation and improving the SNR of the received correlated signal.

Figure 3:
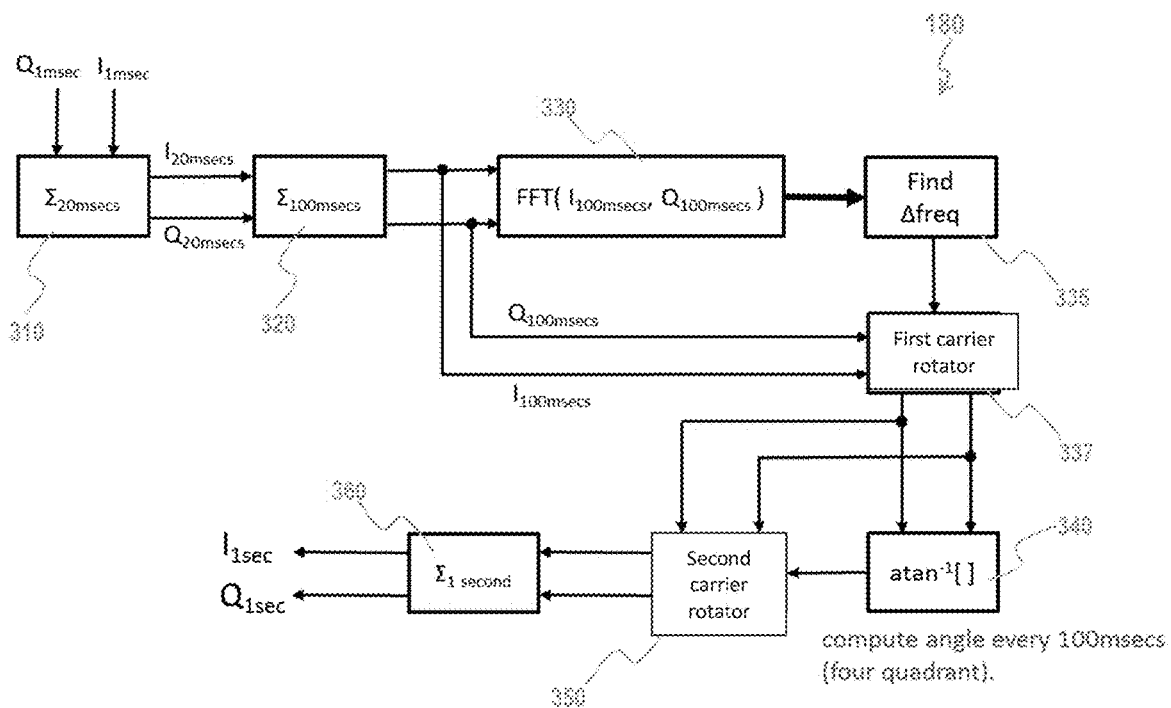
FIG. 3 illustrates an exemplary block diagram of the present phase rotation system/method, according to an embodiment.
Figure 4:
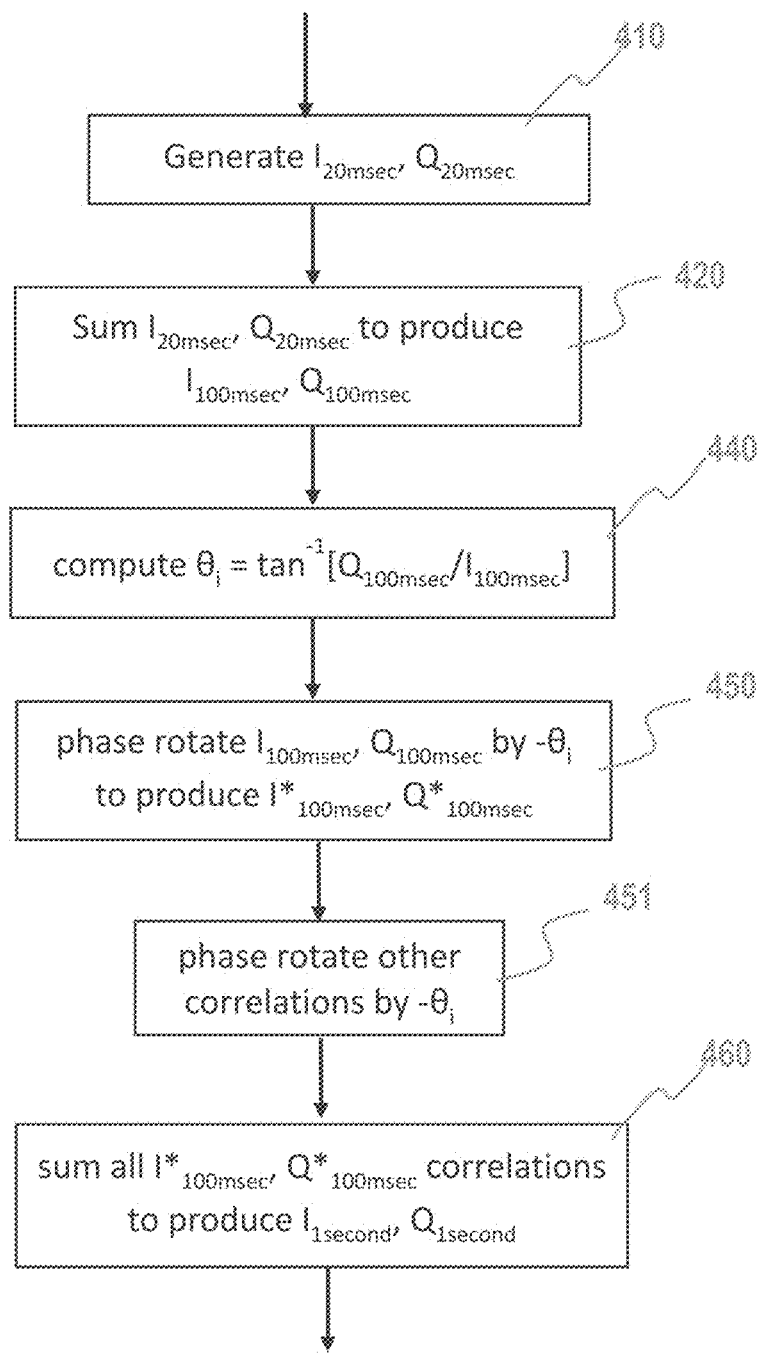
FIG. 4 illustrates an exemplary flowchart of a present phase rotation system/method according to an embodiment.

FIG. 3 illustrates an exemplary block diagram of the present RPA system/method, according to an embodiment, while FIG. 4 illustrates an exemplary flowchart of a present RPA system/method according to an embodiment of the present disclosure.

At 410, summer 310 sums the correlated coherent $I_{1\ msec}$ and $Q_{1\ msec}$ values to generate the coherent $I_{20\ msec}$ and $Q_{20\ msec}$ values. At 420, summer 320 sums the coherent $I_{20\ msec}$ and $Q_{20\ msec}$ values to generate the coherent $I_{100\ msec}$ and $Q_{100\ msec}$ values. As would be understood by one of ordinary skill in the art, the 100 msec sums could be generated directly from the 1 msec values, bypassing the 20 msec summation. This is not done in practice because the 20 msec sums are useful as an input for many other algorithms/components. At 440, module 340 in FIG. 3 calculates $\theta_i$, an arctangent of $Q_{100\ msec}$ divided by $I_{100\ msec}$. At 450, carrier rotator 350 uses the value $\theta_i$ from 440 to phase rotate the coherent $I_{100\ msec}$ and $Q_{100\ msec}$ values by $-\theta_i$. At 451, carrier rotator 350 uses the value $\theta_i$ to phase rotate the remaining nine coherent $I_{100\ msec}$ and $Q_{100\ msec}$ values by $-\theta_i$. At 460, summer 360 sums all ten coherent $I^*_{100\ msec}$ and $Q^*_{100\ msec}$ values to generate the coherent $I_{1\ sec}$ and $Q_{1\ sec}$ values.

In FIG. 3, summer 310 sums the correlated coherent $I_{1\ msec}$ and $Q_{1\ msec}$ values to generate the coherent $I_{20\ msec}$ and $Q_{20\ msec}$ values and summer 320 sums the coherent $I_{20\ msec}$ and $Q_{20\ msec}$ values to generate the coherent $I_{100\ msec}$ and $Q_{100\ msec}$ values. FFT module 330 takes the FFT of the $I_{100\ msec}$ and $Q_{100\ msec}$ values from summer 320. Frequency finder 335 uses the output of FFT module 330 to derive frequency difference $\Delta$. First carrier rotator 337 phase rotates the $I_{100\ msec}$ and $Q_{100\ msec}$ values from summer 320 using the frequency difference $\Delta$. The first phase-rotated $I_{100\ msec}$ and $Q_{100\ msec}$ values are used to calculate $\theta_i$ by calculator 340 and are second phase rotated by $-\theta_i$ by second carrier rotator 350. Although these additional modules have shown not to be needed in testing, their purpose in this embodiment is to remove any frequency offset through allow carrier rotation. For example, if the 100 msec sums are phase rotating at 3 Hz then it is advantageous to counter rotate this frequency before measuring and counter rotating the phase. FFT module 330, first carrier rotator 335, and second carrier rotator 337 are not necessary if the AFC keeps the frequency error close. In other words, these additional modules are provided as a means of fine tuning any frequency offset. In testing, the AFC kept the frequency error sufficiently close that the additional FFT module 330, frequency finder 335, and first carrier rotator 337 were not needed.

Figure 5:
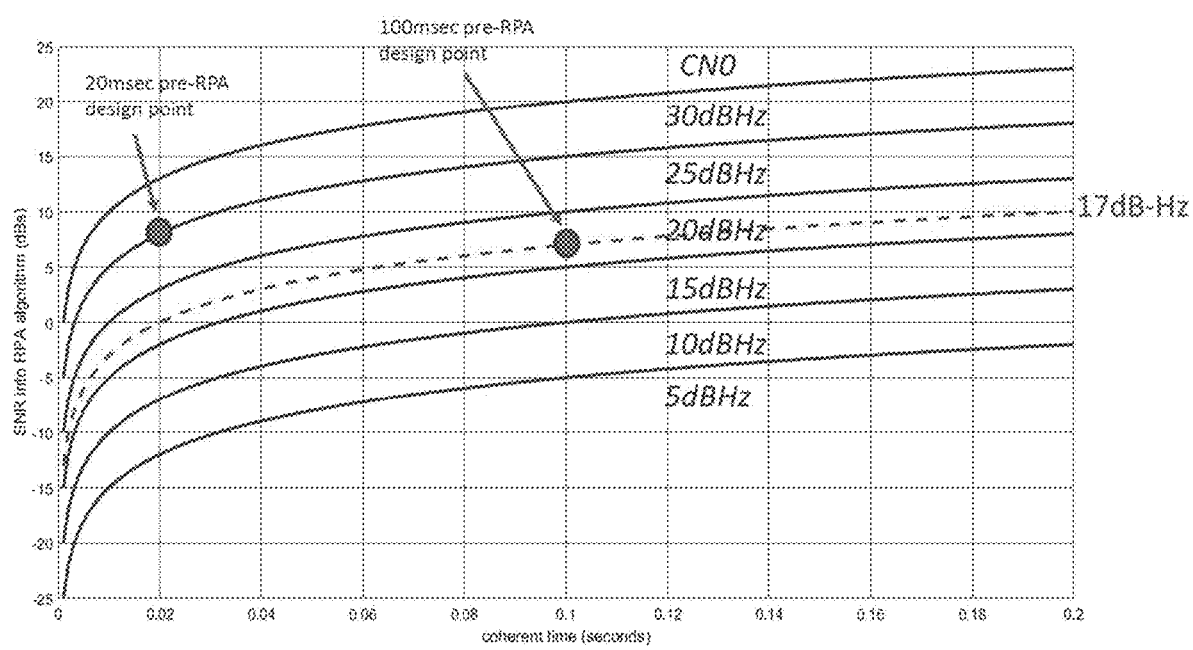
FIG. 5 illustrates exemplary waveforms of the relationship between the coherent integration time and the signal-to-noise ratio (SNR) into the present phase rotation system/method, according to one embodiment.

FIG. 5 illustrates exemplary waveforms of the relationship between the coherent integration time and the signal-to-noise ratio (SNR) into the present phase rotation system/method, according to one embodiment. The RPA requires an input SNR of ≈7-8 dB to operate correctly. An example of operating point is given for 100 sec pre-RPA coherent integration at 17 dB-Hz CNO giving ≈7 dB SNR into the RPA process. It is noted that the RPA process can be run for any CNO≥17 dB-Hz. In other words, it can operate successfully independent of the current carrier phase lock state. It is further noted that the RPA process may be beneficially applied to the strongest correlator pair (I, Q). This results in the best estimate of rotation phase $\theta_i$. The phase rotation can them be applied to all other correlations associated with this satellite's signal. For example, a received correlation window may contain N code phase offset and M frequencies. The RPA process operates on one of the hypothesis (1 code phase×1 carrier frequency). Once $\theta_i$ is computed all other correlation hypothesis are also phase rotated by $\theta_i$.

As discussed above, the benefits provided by long coherent integration to GNSS receiver operation, diagnostics, and error detection/correction are many. Multipath migration is one example.

Multipath mitigation describes methods that try to compensate for or cancel the effects of non-line of sight (NLOS) signals received by a GNSS receiver. Herein, "multipath mitigation" is sometimes used loosely to cover the mitigation of both the effects of multipath propagation, where the GNSS receiver receives both the "true" line of sight (LOS) signal and reflected NLOS signals (following different paths, i.e., multipath) from a satellite/SV, and the effects when the GNSS receiver receives only the NLOS signal(s) of a satellite, but not the actual LOS signal, which is commonplace in urban environments where the sides of "canyons" formed by tall buildings cause many NLOS signals from satellite that are not in direct view. See, e.g., Petrovello, M., *Multipath vs. NLOS signals: How does non-line-of-sight reception differ from multipath interference?* Inside GNSS, November-December 2013, pp. 40-44, which is incorporated by reference herein in its entirety.

Multipath/NLOS signals may significantly reduce the performance of GNSS receivers. See, e.g., Bhuiyan et al., *Multipath mitigation techniques for satellite-based positioning applications*, chapter 17, pp. 405-426, Global navigation satellite systems: signal, theory and applications, In; Jin, S., ed. (InTech: Rijeka, Croatia, 2012), which is incorporated by reference herein in its entirety.

However, long coherent integration may improve multipath mitigation in two ways:

By providing a higher SNR to be used in multipath mitigation algorithms. An example would be when used together with the earliest energy detection algorithm where high SNR leads to improved detection probability ($P_d$) and false alarm probability ($P_{fa}$) statistics and/or faster operation of the algorithm (earliest energy may be detected in 200 msecs instead of 1 second).

As a means of providing narrow bandwidth channels that can be searched for the earliest arriving energy at a particular carrier frequency. In other words, providing the ability to isolate multipath components via the carrier frequency domain. This is most useful in scenarios where the receiver is moving.

Figure 6:
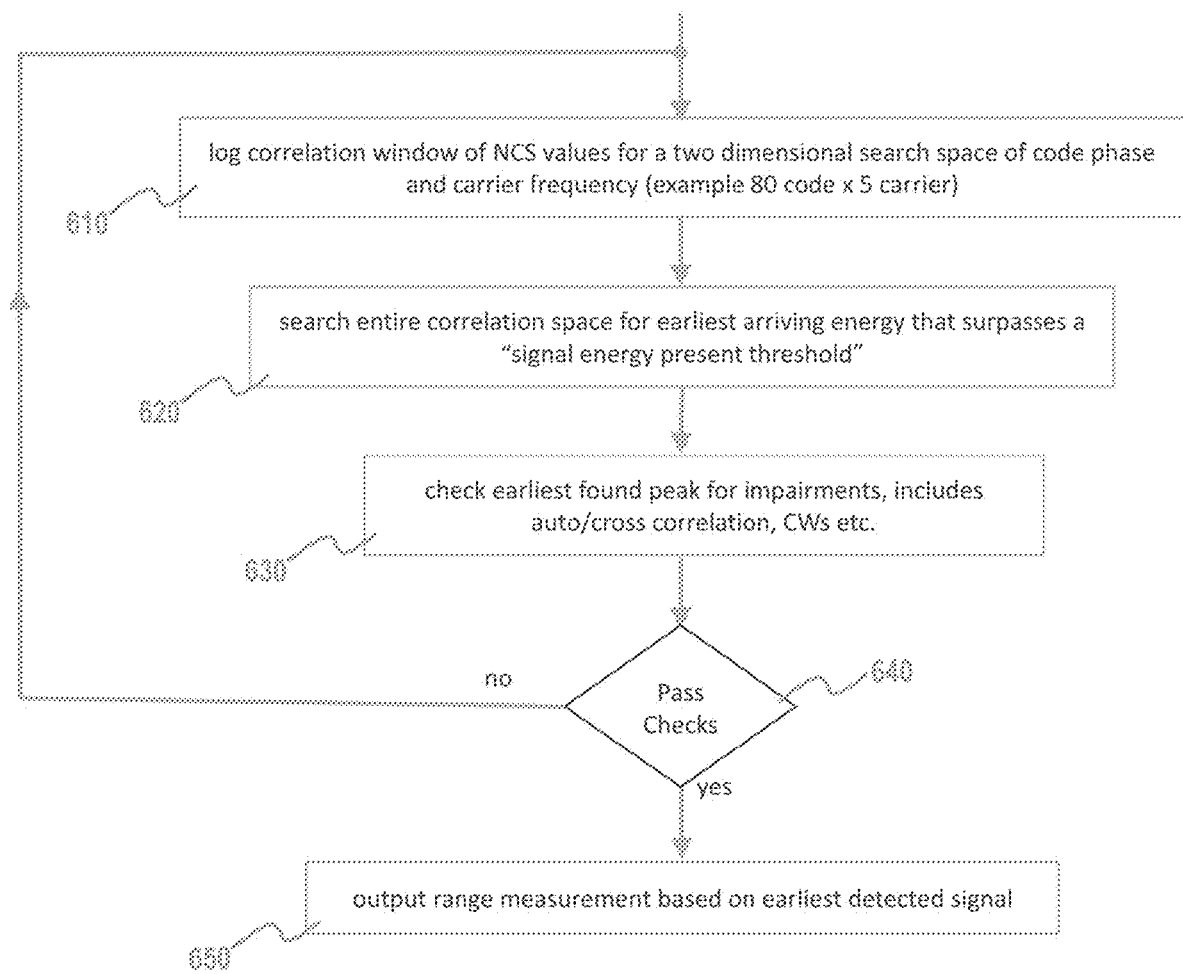
FIG. 6 illustrates an exemplary flowchart for providing the earliest energy detection of a received GNSS signal, according to one embodiment.

FIG. 6 illustrates an exemplary flowchart for providing the earliest energy detection of a received GNSS signal, according to one embodiment. The process of the present system/method integrates the signal for some time before checking the range of code phase and carrier frequency hypothesis to determine where the earliest energy is. More specifically, the present system/method at 610 logs a correlation window of non-coherent signal values in a two-dimensional search space of code phase and carrier frequency. For example, the correlation window may be 5 carrier frequencies by 80 different code phases within the two-dimensional search space. At 620, the present system/method uses this correlation window to search over the entire two-dimensional search space, looking for an integration of energy amplitude that exceeds a signal energy present threshold (or "the earliest arriving energy peak"). When the signal energy present threshold is exceeded in 620, the present system/method checks this found earliest arriving energy peak for impairments at 630 (which includes the possibility it is not the "true" earliest arriving peak). As is well-known to one of ordinary skill in the art, such impairment checks may be performed by cross-correlation, auto-correlation, continuous-wave (CW) detection, etc. If the found peak passes the impairment check in 640, the present system/method outputs the range measurement using the found earliest arriving peak at 650.

The earliest energy peak detection process such as shown in FIG. 6 benefits from the increased SNR of long coherent integration by providing similar performance with smaller integration times and/or by improving probability of detection and probability of false alarm statistics.

Figure 7:
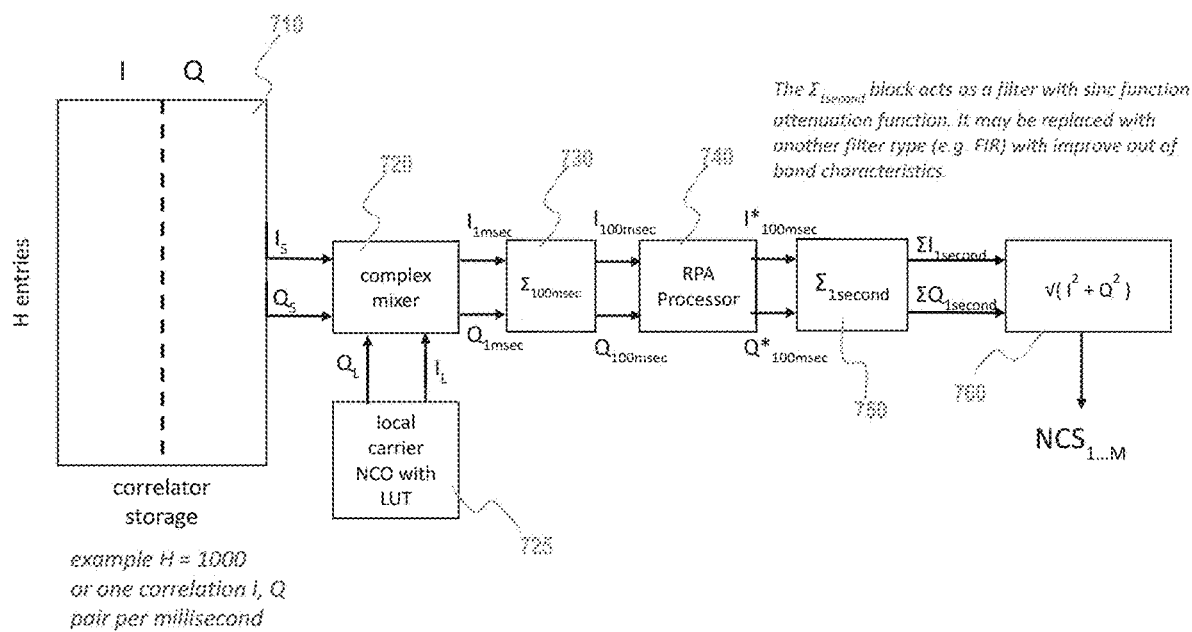
FIG. 7 illustrates an exemplary block diagram of the present multipath mitigation architecture, according to one embodiment.

FIG. 7 illustrates an exemplary block diagram of the present multipath mitigation architecture, according to one embodiment. As shown in FIG. 7, correlator storage 710 can fit H entries, where each entry includes a 1 msec I/Q correlated pair. Since H=1000, 1000×1 msec of correlated signals are received and stored in correlator storage 710. Each stored sample is fed, in order to the chain of components shown in FIG. 7. First, each 1 msec I/Q pair is mixed by complex mixer 720 with a locally generated version of the originating satellite carrier frequency. Specifically, numerically controlled oscillator (NCO) 725 generates a local carrier frequency complex signal $I_L$, $Q_L$ using a lookup table (LUT) and this is the signal mixed with the 1 msec I/Q pair.

Summer 730 receives 100×1 msec I/Q pairs to provide coherent integration over 100 msecs. These coherent values $I_{100\ msec}$ and $Q_{100\ msec}$ are input to RPA processor 740 to generate modified coherent values $I^*_{100\ msec}$ and $Q^*_{100\ msec}$. Summer 750 receives and coherently integrates 10 of these modified coherent $I^*_{100\ msec}$ and $Q^*_{100\ msec}$ values to generate the long coherent integration values $I_{1\ sec}$, and $Q_{1\ sec}$. Summer 750 also acts as a filter with a sinc attenuation function, but this function may be performed by another filter type, such as a finite impulse response (FIR) filter, as would be understood by one of ordinary skill in the art. Module 760 calculates the amplitude for each 1 sec interval, and those energy amplitude values can be used in, for example, the earliest arriving energy detection algorithm.

As mentioned above, the present system/method provides the ability to isolate multipath components in challenging environments, such as when the GNSS receiver is moving rapidly. When the GNSS receiver is moving, the Doppler effect on the GNSS signal can be calculated using Equation (1) below:

$$f_R = f_0 \frac{v}{c} \quad (11)$$

where $f_R$ is the Doppler effect measured at the GNSS receiver, $f_0$ is the carrier frequency (e.g., 1575.42 MHz), v is the velocity of the GNSS receiver (measured in meters per second=$ms^{-1}$), and c is the speed of light.

Using Equation (11), at a relative speed of 70 mph≈31.3 $ms^{-1}$, the Doppler effect $f_R$≈±164 Hz. As explained in detail below, the present system/method can use a successive frequency narrowing method, e.g., start with 100 msec (10 Hz), then 2 Hz, then 1 Hz, to find energy peaks first and then zoom in to separate different multipath frequency components. The frequency search can also be performed via an FFT/IFFT operation.

Figure 8:
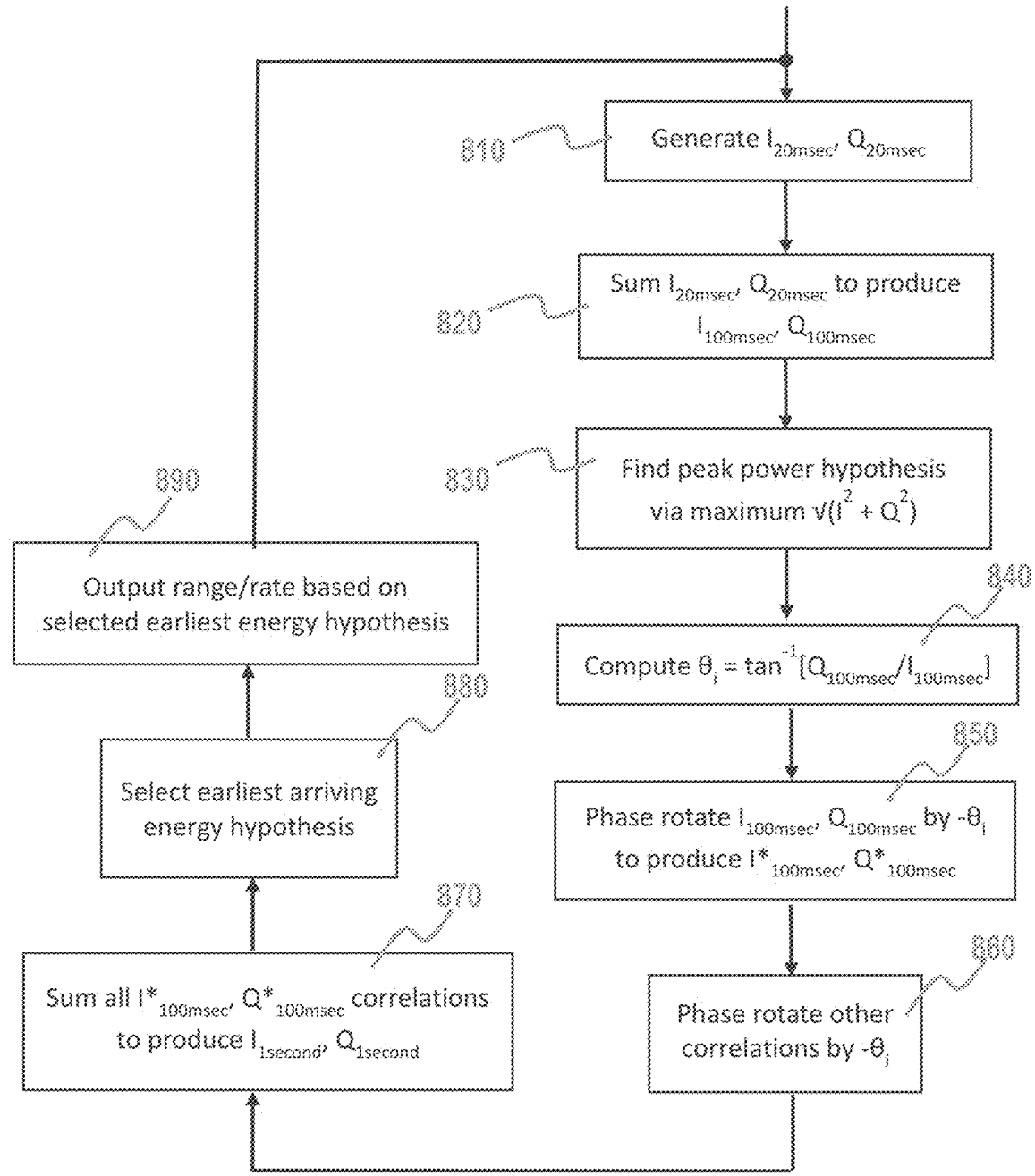
FIG. 8 illustrates an exemplary flowchart of a method for providing multipath mitigation frequency zoom, according to one embodiment.

FIG. 8 illustrates an exemplary flowchart of a method for providing multipath mitigation frequency zoom that is more efficient in terms of how many hypotheses are searched, according to one embodiment. The present frequency zoom process uses 100 msec coherent integration to find energy and then only searches those regions which meet the signal energy found hypothesis/threshold using the full 1 second coherent integration. While FIG. 8 shows a two tier frequency zoom, it could be extended to more than two, as would be understood by one of ordinary skill in the art.

At 810, the present system/method sums the correlated coherent 1 msec and $Q_{1\ msec}$ values to generate the coherent $I_{20\ msec}$ and $Q_{20\ msec}$ values. At 820, the present system/method sums the coherent $I_{20\ msec}$ and $Q_{20\ msec}$ values to generate the coherent $I_{100\ msec}$ and $Q_{100\ msec}$ values. At 830, the amplitude is calculated for the coherent $I_{100\ msec}$ and $Q_{100\ msec}$ values in the search space, and one or more peak energy amplitude regions are selected as peak power hypotheses. The remaining steps are only performed in the selected peak power hypothesis regions. At 840, the present system/method calculates the arctangent of $Q_{100\ msec}$ divided by $I_{100\ msec}$. At 850, the present system/method uses the resulting value $\theta_i$ from 840 to phase rotate the coherent $I_{100\ msec}$ and $Q_{100\ msec}$ values by $-\theta_i$. Once the value $\theta_i$ is calculated at 840, the present system/method uses it to phase rotate the remaining nine coherent $I_{100\ msec}$ and $Q_{100\ msec}$ values by $-\theta_i$ at 860.

At 870, the present system/method sums all ten coherent $I^*_{100\ msec}$ and $Q^*_{100\ msec}$ values to generate the coherent $I_{1\ sec}$ and $Q_{1\ sec}$ values. These long coherent $I_{1\ sec}$ and $Q_{1\ sec}$ values are used at 880 to select an earliest arriving energy hypothesis, which is then used at 890 to generate range/rate measurements. Then, the present system/method loops back to do it again.

Figure 9:
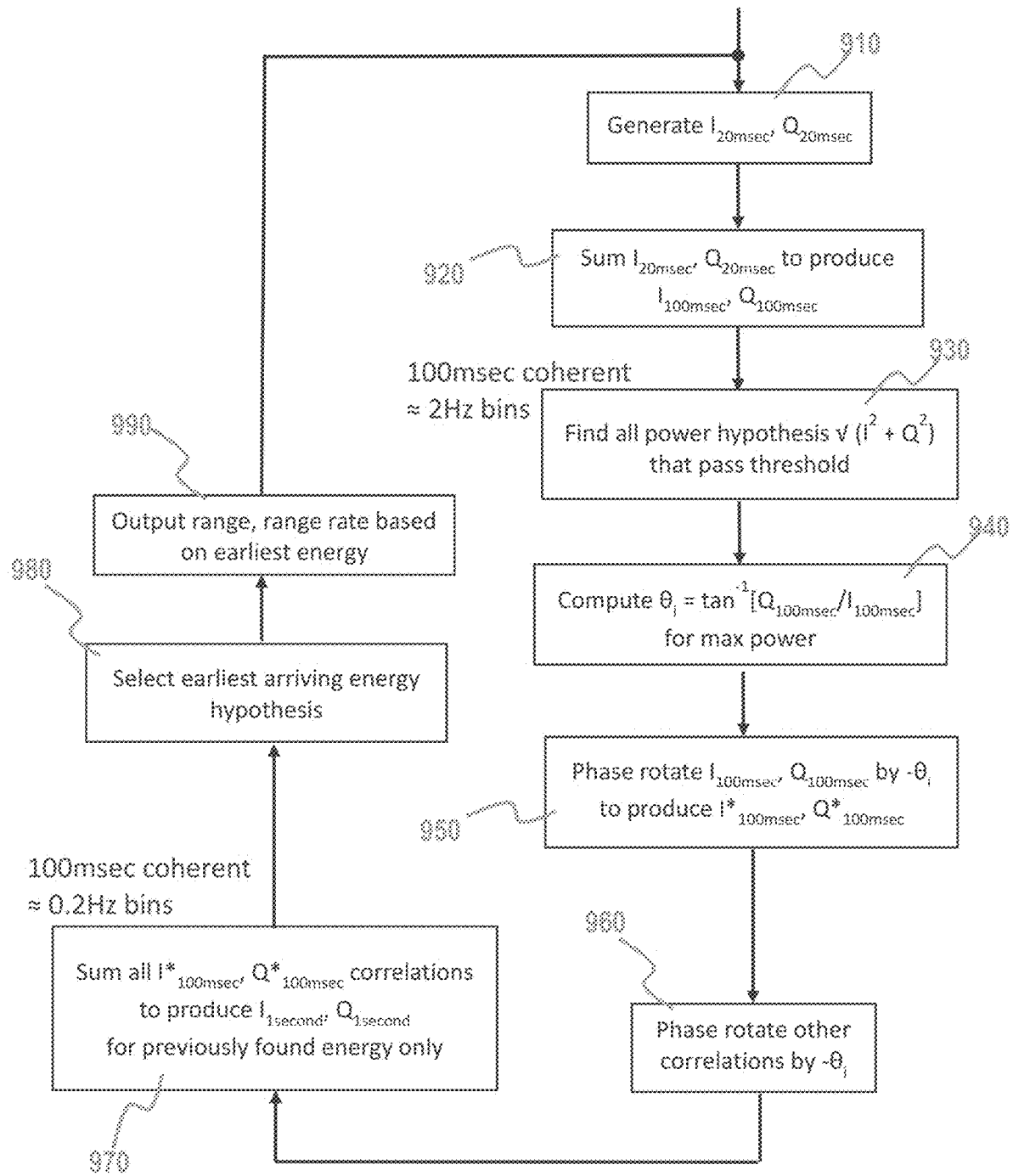
FIG. 9 illustrates an exemplary flowchart of a method for providing a successive zoom frequency search, according to an embodiment.

FIG. 9 illustrates an exemplary flowchart of a method for providing a successive zoom frequency search, according to an embodiment. At 910, the present system/method sums the correlated coherent $I_{1\ msec}$ and $Q_{1\ msec}$ values to generate the coherent $I_{20\ msec}$ and $Q_{20\ msec}$ values. At 920, the present system/method sums the coherent $I_{20\ msec}$ and $Q_{20\ msec}$ values to generate the coherent $I_{100\ msec}$ and $Q_{100\ msec}$ values.

At 930, the amplitude is calculated for the coherent $I_{100\ msec}$ and $Q_{100\ msec}$ values in the search space, and a threshold is used to select one or more peak energy amplitude regions as peak power hypotheses. The remaining steps are only performed in the selected peak power hypothesis regions. At 940, the present system/method calculates the arctangent of $Q_{100\ msec}$ divided by $I_{100\ msec}$ for the coherent $I_{100\ msec}$ and $Q_{100\ msec}$ values having the maximum power. At 950, the present system/method uses the resulting value $\theta_i$ from 940 to phase rotate the remaining coherent $I_{100\ msec}$ and $Q_{100\ msec}$ values by $-\theta_i$. Once the value $\theta_i$ is calculated at 940, the present system/method uses it to phase rotate the remaining nine coherent $I_{100\ msec}$ and $Q_{100\ msec}$ values by $-\theta_i$ at 960. At 970, the present system/method sums all ten coherent $I^*_{100\ msec}$ and $Q^*_{100\ msec}$ values to generate the coherent $I_{1\ sec}$ and $Q_{1\ sec}$ values. These long coherent $I_{1\ sec}$ and $Q_{1\ sec}$ values are used at 980 to select an earliest arriving energy hypothesis, which is then used at 990 to generate range/rate measurements. Then the present system/method loops back to the beginning.

Cross correlation is an issue where strong satellite signals can interfere with the reception of weak satellite signals. The amount of interference between satellite signals is a function of how far apart their received carrier frequencies are, the coherent integration period, and the received power from each satellite signal. According to one embodiment, the present system/method uses long coherent integration to provide improved cross correlation.

For example, a 20 msec coherent integration of a weak satellite's signal creates a frequency vs. amplitude sine function with a main lobe of ±50 Hz. If another satellite has a stronger signal, the stronger satellite can get within 25 Hz (using modulo-1 kHz arithmetic) of the weak satellite's carrier frequency and only be 3.8 dB less in amplitude than the weak satellite. However, extending it to a 1 second coherent integration period, the same 24.5 Hz would be 37.8 dB less in amplitude, thus improving the cross correlation isolation between the two satellites.

The benefit of multipath mitigation methods include:
- Narrow frequency search for multipath components, i.e., the capability to observe multipath components individually without interference from other components that are offset in frequency
- Search for the earliest energy in code phase and carrier frequency space
- Frequency zoom method combining different coherent periods with non-coherent to speed up earliest energy search
- Other impairment metrics include, but are not limited to, multipath distortion metrics, CW detection, frequency side lobe, earliest energy algorithm, cross correlation detection, HRC metrics The present system and method may further utilize variable combinations of coherent/non-coherent times. The present system and method may further utilize variable time frames, e.g., 20 msecs to 20 seconds. The present system and method may further make use of long coherent integration to improve performance of impairment metrics, e.g., CW detection, and multipath distortion metrics. The present system and method may make use of long coherent integration to perform multipath mitigation operations, including correlation domain frequency searches for earliest arriving energy detection.

Long coherent integration periods may result in improved time to process completion and improved $P_{fa}$ and $P_d$ statistics. Some processes that may benefit from increased coherent integration include:
- CW detection
- Lock detect
- Multipath detection and mitigation
- Frequency side lobe detection
- Cross correlation detection
- HRC algorithms All modernized signals have pilot components, which sometimes transmit more power than the data carrying signal components. For example, the GPS L1-C signal transmits 75% of its power in the pilot channel, and only 25% on its data channel. Thus, going forward, it is not unreasonable to assume a successful PLL phase lock at 20 dB-Hz so that the full 20 dB SNR per second is available to the present system/method, instead of a 11.5 dB phase lock with a 20 msecs×50 SNR of the typical non coherent summation (NCS) architecture.

To be effective for navigation, a GNSS signal needs to be ≥15 dB-Hz. Therefore, one goal is to improve GNSS signal reception in the lowest regions ≥15 dB-Hz. With carrier phase lock, extended coherent integration is already possible (≥26 dB-GHz for GPS L1 C/A, ≥20 dB-Hz for Galileo E1-C). A 1 second coherent integration according to embodiments of the present disclosure is a good trade-off between SNR improvement and speed of system response. 1 Hz is a natural period in GNSS receivers. For example, position fixes are usually output at a 1 Hz rate.

According to one embodiment, the present system performs a 100 msec coherent integration period before performing RPA, and coherent integration is subsequently continued to 1 second. Other initial coherent periods may be used before the RPA process is applied (e.g., 40 msec, 50 msec, 60 msec, 80 msec, 150 msec, and 200 msec). In one embodiment, if carrier phase lock is maintained, the present system may perform a 20 msec coherent integration and no data stripping is required. The present system may further the RPA process on 20 msec I and Q, or just a straight integration of I and Q (without the RPA process). To avoid too much added noise, the present system does not operate without the RPA process near the Costas loop sensitivity threshold. When carrier phase lock is not maintained, data stripping is required to allow the initial 100 msec coherent integration to take place.

Tests and simulations, some of which are detailed in U.S. Provisional Patent Application Ser. No. 62/633,317 filed on Feb. 21, 2018, from which the present application claims priority and which is incorporated by reference in its entirety, have shown that a 100 msec initial coherent integration period results in ≈0.5-1 dB CNO loss due to TCXO phase random walk noise during coherent integration period. By observing Spirent test results, an initial coherent period of 80 msecs was observed to have slightly better performance than 60 or 100 msecs (by ≈0.2 dB).

Figure 10:
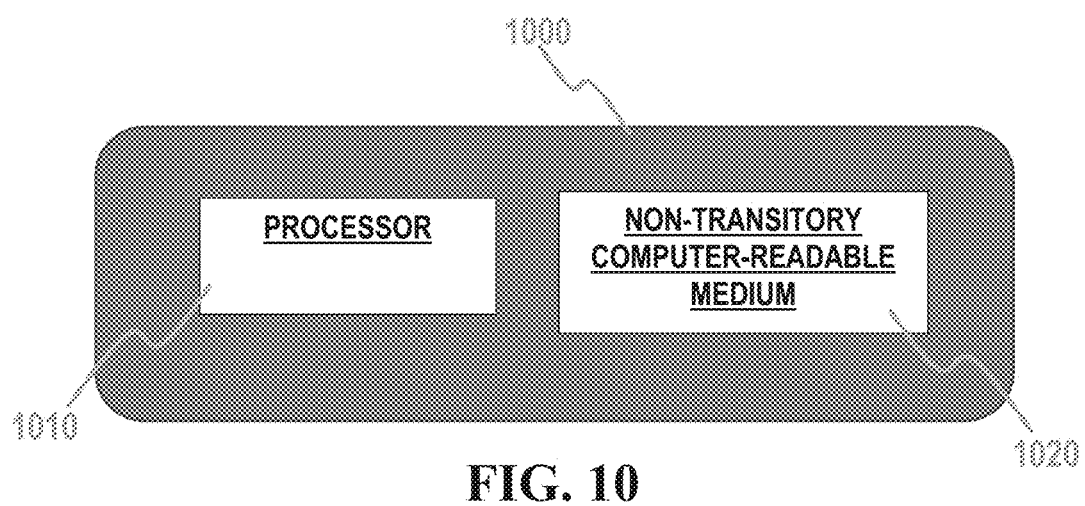
FIG. 10 illustrates an exemplary diagram of the present apparatus, according to an embodiment.

FIG. 10 illustrates an exemplary diagram of the present apparatus, according to one embodiment. An apparatus 1000 includes at least one processor 1010 and one or more non-transitory computer readable media 1020. The at least one processor 1010, when executing instructions stored on the one or more non-transitory computer readable media 1020, performs the steps of generating coherent 20 msec in-phase (I) correlations and coherent 20 msec quadrature (Q) correlations by summing coherent 1 msec complex signal samples; generating coherent 100 msec I correlations and coherent 100 msec Q correlations by summing the generated coherent 20 msec I correlations and the generated coherent 20 msec Q correlations; and generating coherent 1 sec I correlations and coherent 1 sec Q correlations by summing the generated coherent 100 msec I correlations and the generated coherent 100 msec Q correlations.

Moreover, the one or more non-transitory computer-readable media 1020 stores instructions for the at least one processor 1010 to perform those steps.

Figure 11:
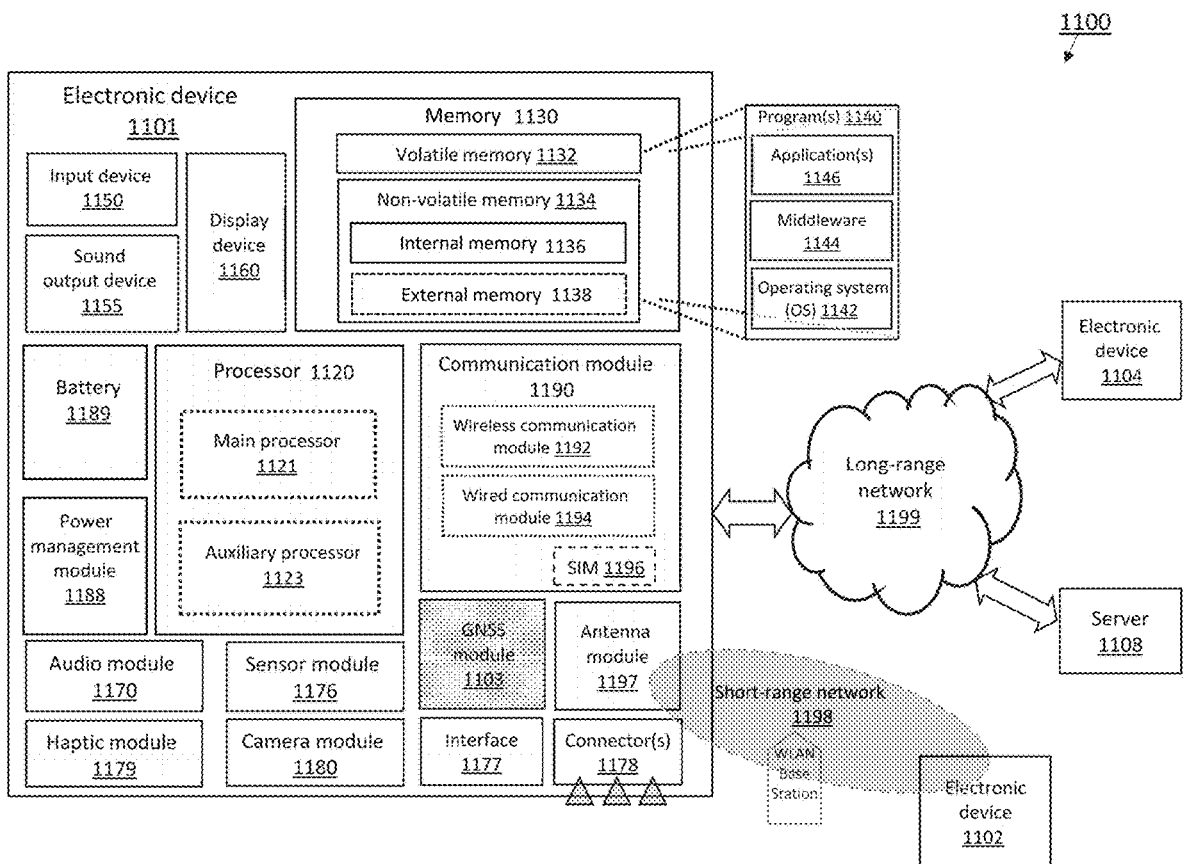
FIG. 11 illustrates an exemplary block diagram of an electronic device 1101 in a network environment 1100, according to an embodiment.

FIG. 11 is an exemplary block diagram of an electronic device 1101 in a network environment 1100, according to one embodiment. Electronic device 1101 according to one embodiment may be, for example, a portable communication device (e.g., a smart phone), a computer, a portable multimedia device, a portable medical device, a camera, a wearable device, or a home appliance. However, this is a list of examples, and an electronic device according to the present disclosure is not limited to any of those listed and/or described herein.

Referring to FIG. 11, electronic device 1101 in network environment 100 may communicate with an external electronic device 1102 via short-range wireless communication network 1198 (or "first network"), or communicate with another external electronic device 1104 or a server 1108 via a long-range wireless communication network 1199 (or "second network"). According to one embodiment, electronic device 1101 may communicate with electronic device 1104 via server 1108. Each of electronic devices 1102 and 1104 may be different or the same type of device as electronic device 1101. According to one embodiment, all or some of the operations described herein may be executed at one or more external devices/systems (e.g., external electronic devices 1102 and 1104, or server 1108) rather than being executed by electronic device 1101. For example, electronic device 1101 may request one or more external devices/systems to perform at least part of a function or a service being performed/executed. The one or more external devices/systems receiving the request would transfer the suitable/appropriate outcome of performing at least part of a function or a service to the electronic device 1101. In this regard, cloud computing, distributed computing, and/or client-server computing technology may be used, for example, with electronic device 1101.

Electronic device 1101 includes processor 1120, memory 1130, input device 1150, sound output device 1155, display device 1160, audio module 1170, sensor module 1176, interface 1177, haptic module 1179, camera module 1180, power management module 1188, battery 1189, communication module 1190, GNSS module 1103, and antenna module 1197. In one embodiment, one or more components (e.g., haptic module 1179 or camera module 1180) may be omitted from, or one or more other components may be added to, electronic device 1101. In one embodiment, some of the components may be implemented as a single integrated circuit (IC). For example, the sensor module 1176 (e.g., a fingerprint sensor, an iris sensor, or an illuminance sensor) may be embedded in the display device 1160 (e.g., a display screen).

Electronic device 1101 has one or more internal communication and/or power transmission systems to which the one or more components in electronic device 1101 are connected for inter-component communication and/or power reception/transmission. Such systems allow the one or more components to communicate data and commands amongst themselves, as well as to provide timing, power, and other signals. Such a system may be implemented via an inter-peripheral communication scheme, such as, e.g., a bus, a general purpose input and output (GPIO), a serial peripheral interface (SPI), a mobile industry processor interface (MIPI), and/or the like, as would be understood by one of ordinary skill in the art.

Processor 1120 executes software (e.g., program 1140) to, for example, control one or more hardware/software components of the electronic device 1101, or perform various data processing or computations. As at least part of the data processing or computations, processor 1120 may, for example, load a command or data received from a component of the electronic device 1101 (e.g., sensor module 1176 or communication module 1190) in volatile memory 1132, process/execute the command or the data stored in the volatile memory 1132, and store the result in non-volatile memory 1134. Processor 1120 includes a main processor 1121 (which may include, e.g., a central processing unit (CPU) and/or an application processor (AP)), and an auxiliary processor 1123 (which may include, e.g., a graphics processing unit (GPU) and/or an image signal processor (ISP). In this embodiment, auxiliary processor 1123 is implemented separately from main processor 1121, and may be operable independently from, or in conjunction with, main processor 1121. Auxiliary processor 1123 may be adapted to consume less power than main processor 1121, to execute one or more particular functions, and/or to be a part of main processor 1121. Additionally or alternatively, main processor 1121 and/or auxiliary processor 1123 may include a sensor hub processor, a communication processor (CP), or the like.

Auxiliary processor 1123 may control at least some of the functions or states related to one or more components of the electronic device 1101 (e.g., display device 1160, sensor module 1176, and/or communication module 1190) while main processor 1121 is in an inactive state (e.g., sleep). Additionally or alternatively, auxiliary processor 1123 may control at least some of the functions or states related to one or more components of the electronic device 1101 together with main processor 1121 while the main processor 1121 is in an active state (such as, e.g., executing an application). Depending on the embodiment, one or more processors (such as, e.g., an image signal processor or a communication processor) and/or processor functions may be implemented as part of one or more components of the electronic device 1101 (such as, e.g., camera module 1180 and/or communication module 1190).

Memory 1130 stores data, for examples, generated by and/or used by one or more components of the electronic device 101 (such as, e.g., processor 1120 or sensor module 1176). Such stored data may include, for example, software/executable instructions (e.g., program(s) 1140), input data, output data, operating parameters/instructions, and the like, as would be understood by one of ordinary skill in the art. In this embodiment, memory 1130 includes volatile memory 1132 and non-volatile memory 1134.

Program(s) 1140 stored in memory 1130 includes operating system (OS) 1142, middleware 1144, and application(s) 1146, as discussed further below in reference to FIG. 12. Input device 1150 receives external commands or data (such as from, e.g., a user) to be used by one or more components of the electronic device 1101 (such as, e.g., processor 1120). The input device 1150 may include, for example, a microphone, a mouse, and/or a keyboard. Sound output device 1155 outputs sound signals and may include, for example, one or more speakers that may be used for general purposes, such as playing multimedia or recording, as well as for providing the audio component of a call. According to one embodiment, the audio component of a call may be provided by a separate component and/or only partially by the speaker of sound output device 1155.

Display device 1160 provides images/video by means of, for example, one or more of a display screen, a touch screen, a hologram device, or a projector, and includes control circuitry to control the one or more of the display screen, touch screen, hologram device, or projector. According to an embodiment with a display touchscreen, the display device 1160 may include touch circuitry/sensor circuitry (e.g., a pressure sensor) adapted to detect a contact/touch/hover and/or to measure the force, trajectory, speed, relative movement in 3D space, etc., of such a detected contact/touch/hover. Audio module 1170 converts sound into electrical signals and vice versa. Depending on the embodiment, audio module 170 may obtain sound via input device 1150, output sound via sound output device 1155, input/output sound via headphones connected by wire to connector(s) 1178 of the electronic device 1101, input/output sound via headphones wirelessly connected to the electronic device 1101, and/or input/output sound via an external electronic device (e.g., electronic device 1102) connected by wire or wirelessly with the electronic device 1101.

Sensor module 1176 detects an environmental state (including, e.g., a state of a user) external to the electronic device 1101, and/or an operational state (e.g., power or temperature) of the electronic device 1101 and then generates an electrical signal/data value corresponding to the detected state. Sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor. Interface 1177 supports one or more interface/communication protocols for the electronic device 101 to interface/communicate with a wide variety of external electronic devices. According to one embodiment, interface 1177 supports, for example, a high definition multimedia interface (HDMI), a universal serial bus (USB) interface, a secure digital (SD) card interface, an audio-based interface, a radio-based interface, and/or the like, as would be understood by one of ordinary skill in the art. Connector(s) 1178 include one or more physical connectors by which one or more external devices/objects may be physically connected with the electronic device 1101. Connector(s) 1178 may include, for example, one or more of an HDMI input, a USB input, an SD card input, an audio jack, an Ethernet plug, and/or the like, as would be understood by one of ordinary skill in the art.

Haptic module 1179 converts an electrical signal into mechanical vibration/movement to generate a tactile sensation or kinesthetic sensation for anyone holding electronic device 1101. Haptic module 1179 may include, for example, a motor, a piezoelectric element, and/or an electrical stimulator. Camera module 1180 captures still and/or moving images/videos. Camera module 1180 may include and/or be connected with lenses, image sensors, image signal processors, lighting devices (such as flashes or light diodes), image generators for the user to see/aim the camera, and/or other circuitry, as would be well-known to one of ordinary skill in the art of implementing a photographing capability in a portable device. Power management module 1188 manages at least one of the power input/supplied to the electronic device 1101, battery 1189, and/or the power distributed among one or more components of the electronic device 1101. Power management module 1188 may be implemented as at least part of, for example, a power management integrated circuit (PMIC). Battery 1189 may supply power to one or more components of the electronic device 1101 and may be partly or fully under control of power management module 1188. Battery 1189 may include, for example, at least one of a primary cell which is not rechargeable, a secondary cell which is rechargeable, or a fuel cell.

Communication module 1190 supports wireless communication through wireless communication module 1192 and wired communication through wired communication module 1194. For example, communication module 190 may establish a direct communication channel between the electronic device 1101 and an external electronic device (via a wired connection using wired communication module 1194 and connector(s) 1178) and/or establish a wireless communication channel between the electronic device 1101 and the same or another external electronic device (via a wireless connection using wireless communication module 1192 and, for example, antenna module 1197). Communication module 1190 may include one or more communication processors that are operable independently from processor 1120 and are for establishing and/or maintaining wired and/or wireless communication. Wireless communication module 1192 supports at least one of long-range wireless communication (such as, e.g., cellular network communication, wide area network (WAN) communication, and/or any other long- to mid-range communication) and short-range wireless communication (such as, e.g., near field communication (NFC), Bluetooth™, wireless LAN (WLAN) communication under any IEEE 802.11 or 802.15 standard, wireless-fidelity (Wi-Fi), infrared communication under an Infrared Data Association (IrDA) standard, ZigBEE™ and/or any other proprietary short-range communication standards, and/or any other short- to mid-range communication).

Wired communication module 1194 supports any practicable wired communication, as would be understood by one of ordinary skill in the art, such as, e.g., power line communication (PLC), Ethernet communication such as those under any IEEE 802.3 standard, optical internetworking, connecting with the Internet, and/or any other communication/networking using any sort of wire capable of carrying a signal or wired connector. Communication module 1190 may be implemented as a single component (e.g., a single IC), or may be implemented as multiple components/ICs (such as, e.g., the wireless communication module 1192 and wired communication module 1194) that are separate from each other. Communication module 1190 uses subscriber information (e.g., international mobile subscriber identity (IMSI)) stored in subscriber identification module (SIM) 1196 to identify and authenticate electronic device 1101 to a telecommunication network. Antenna module 1197 may transmit or receive a signal and/or power to or from the outside of the electronic device 1101. Antenna module 1197 may include a plurality of antennas, where different subsets of the plurality of antennas are appropriate/suitable for each of the different antenna-based communication schemes/networks/protocols supported by communication module 1190.

GNSS module 1103 receives and processes signals from overhead satellites from one or more GNSSs. Broadly speaking, the reception/processing of GNSS signals involves three phases: acquisition, tracking, and positional calculation, resulting in a "navigation solution"/PVT/PNT. The present location of any satellites, or Space Vehicles (SVs), in view is estimated based on the GNSS receiver's location, the time, and previously stored information concerning the orbits of the SVs in view from one or more GNSS constellations. The resulting estimated azimuth and elevation coordinates for each SV is then used to "acquire" the actual rough locations of (at least some of) the SVs using the GNSS signals presently being received. Generally, acquisition involves (1) detecting each SV signal in code delay (in most GNSS systems, each SV has its own CDMA code) and Doppler frequency; and (2) determining the rough code delay and Doppler frequency (and position) of any detected SV's. The two dimensions of code delay and Doppler frequency are often referred to as the acquisition search space. Using the coarse data-code delay, Doppler frequency, and position—from acquisition, the received GNSS signals are fine-tuned, or more specifically "tracked" using loops, typically a delay lock loop (DLL) and a phase lock loop (PLL). Once a certain level of tracking precision is met, the data embedded in the GNSS signal can finally be decoded and used to calculate the position, velocity, and/or exact time of the present location of the GNSS receiver. These calculations are fed back into the process, thereby creating a constantly repeating loop of estimating, selecting, tracking, calculating, and updating.

Figure 12:
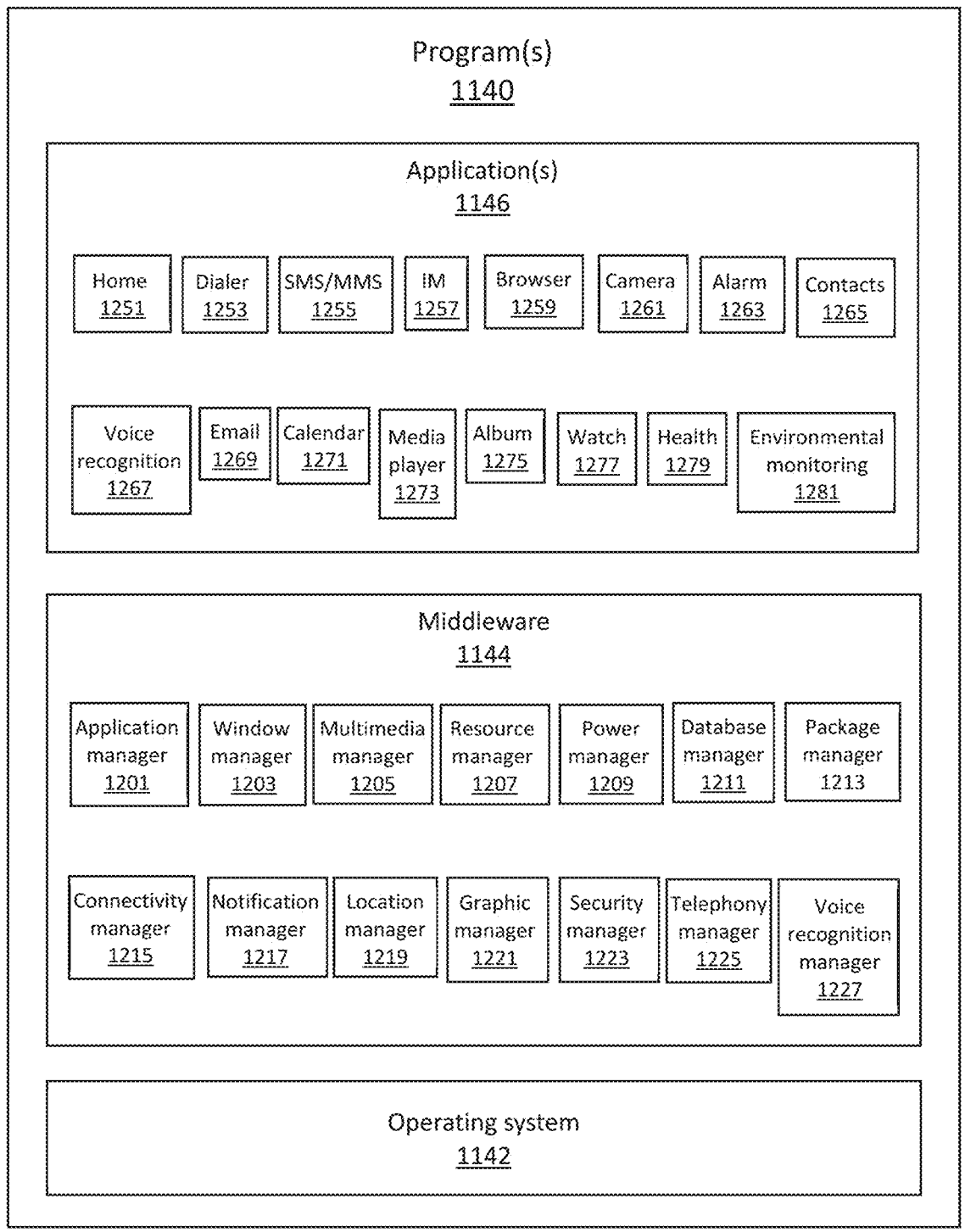
FIG. 12 illustrates an exemplary block diagram of program(s) 1140 from electronic device 1101 in FIG. 11, according to an embodiment.

FIG. 12 illustrates an exemplary block diagram of program(s) 140 from electronic device 1101 in FIG. 11, according to an embodiment. Program(s), application(s), and other such terms may be used herein in the singular form for convenience of explanation, and are not intended as limiting in any sense. Referring to FIG. 12, program 1140 includes at least one executable application 1146, middleware 1144, and at least one operating system (OS) 1142 to control one or more resources of electronic device 1101. OS 1142 may be any of, for example, Android®, iOS®, Windows®, Symbian®, Tizen®, or Bada™. At least part of program 1140 may be pre-loaded on electronic device 1101 during/after manufacture and/or may be downloaded from or updated by electronic device 1101 connecting to an external system/device (e.g., the electronic device 1102 or 1104, or the server 1108) before/during use.

OS 1142 controls management of one or more system resources (e.g., allocating, modifying, or deallocating processes, memory, and/or power) of electronic device 1101. Additionally or alternatively, OS 1142 may include one or more driver programs to drive components within (or connected to) electronic device 1101. For example, OS 1142 may have drivers for one or more of input device 1150, sound output device 155, display device 1160, audio module 1170, sensor module 1176, interface 1177, haptic module 1179, camera module 1180, power management module 1188, battery 1189, communication module 1190, the subscriber identification module 1196, or antenna module 1197.

Middleware 1144 provides various functions to application 1146 such that a function or information provided from one or more resources of electronic device 1101 may be used by application 1146. Middleware 1144 includes application manager 1201, window manager 1203, multimedia manager 1205, resource manager 1207, power manager 1209, database manager 1211, package manager 1213, connectivity manager 1215, notification manager 1217, location manager 1219, graphic manager 1221, security manager 1223, telephony manager 1225, and voice recognition manager 1227.

Application manager 1201 manages the life cycle of application(s) 1146. Window manager 1203 manages one or more graphical user interface (GUI) resources that are used on a display screen. Multimedia manager 1205 identifies the format appropriate to access/play a media file, and selects a codec appropriate for the identified format to encode/decode the media file. Resource manager 1207 manages source code of application(s) 1146 and/or the memory space of memory 1130. Power manager 1209 manages/monitors the capacity, temperature, and/or power of battery 1189, and/or determines/provides power-related information to be used for the operations of electronic device 1101. According to one embodiment, power manager 1209 may interoperate with a basic input/output system (BIOS) of electronic device 1101.

Database manager 1211 generates, searches, manages, monitors, and/or modifies one or more databases which, for example, may be used by application(s) 1146. Package manager 1213 manages the installation and/or updates of any application or updates that are distributed in the form of a package file. Connectivity manager 1215 manages communication connections between electronic device 1101 and any external network/system/device. Notification manager 1217 notifies the user of the occurrence of an event (e.g., an incoming call, message, or alert). Location manager 1219 manages/monitors/distributes locational information on electronic device 1101. Graphic manager 1221 manages graphic effects to be shown on display device 160 or other visual display. Security manager 1223 provides system security and/or user authentication. Telephony manager 1225 manages voice/video call functions provided by electronic device 101. Voice recognition manager 1227 provides a voice recognition and/or voice-to-text function. For example, voice recognition manager 1227 may transmit a user's voice data to server 1108, and receive, from server 1108, a command corresponding to a function to be executed on electronic device 1101 based at least in part on the voice data, or text data converted based at least in part on the voice data.

Middleware 1144, as would be understood by one of ordinary skill in the art, may turn on/off, alter/modify, delete, and/or add managers/components. At least a part of middleware 1144 may be implemented as part of OS 1142. As would be understood by one of ordinary skill in the art, middleware 1144 may include more, less, or different managers/components than those listed here. Application(s) 1146 include home application 1251, dialer application 1253, short message service (SMS)/multimedia messaging service (MMS) application 1255, instant messaging (IM) application 1257, browser application 1259, camera application 1261, alarm application 1263, contacts application 1265, voice recognition application 1267, email application 1269, calendar application 1271, media player application 1273, album application 1275, watch application 1277, health application 1279 (e.g., for measuring the degree of workout or biometric information, such as blood sugar, of a user), and environmental monitoring application 1281 (e.g., for measuring atmospheric pressure, humidity, or temperature information).

According to one embodiment, application 1146 may further include, for example, an information exchange application and/or a device management application. The information exchange application supports information exchange between electronic device 1101 and external devices/systems/networks. The information exchange application, for example, may include a notification relay function adapted to transfer designated information/notifications corresponding to an occurrence of an event (e.g., an alert, receipt of an email, a call, an IM message, etc.) to an external electronic device currently being used by the user. Additionally or alternatively, the notification relay function may receive notification information from the external electronic device and provide the notification information to a user of electronic device 1101. The device management application would manage one or more external devices/systems. For example, the device management application may control the power (e.g., turn-on or turn-off) and one or more functions of external devices/systems (e.g., the adjustment of brightness, resolution, or focus of a camera wirelessly connected to electronic device 1101). Additionally or alternatively, the device management application may support the installation, updating, and/or deletion of one or more functions/applications on one or more external devices/systems.

The steps and/or operations described above in relation to an embodiment may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software. More specifically, depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

A "processor" as used herein refers to any device configured to perform one or more operations based on instructions, including, but not limited to, any general purpose processor in communication with a storage medium from which computer-readable instructions can be retrieved, any special-purpose processor configured to execute specific types of instructions (such as a Digital Signal Processor (DSP)), any special-purpose processor where some or all of the instructions are hard-wired into the actual processor design, any combination thereof, and/or any other type of processor. A processor as used herein may take any form, from a simple micro-controller to a completely self-contained computing system having a bus, memory controller, cache, etc., to a group or cluster of computing devices networked together to provide greater processing capability (e.g., distributed computing). A processor as used herein may have one or more cores, and a multi-core processor used to implement an embodiment of the present disclosure may be symmetric or asymmetric. A processor as used herein may include, without limitation, one or more ASICs, standard integrated circuits, controllers executing appropriate instructions, and including microcontrollers and/or embedded controllers, FPGAs, CPLDs, microprocessors, and the like.

The term "non-transitory computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, EEPROM, any other memory chip or cartridge, or any other medium on which instructions which can be executed by a processor are stored.

Thus, methods according to embodiments of the present disclosure may be implemented by devices constructed to perform the operations (such as hardware circuits), or implemented as programs and/or higher-level instructions to be provided to one or more processors for performance/implementation (such as instructions stored in a non-transitory memory), and/or that includes machine-level instructions stored in, e.g., firmware or non-volatile memory. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Accordingly, embodiments of the present disclosure may be implemented in a wide variety of computing architectures and environments, as would be understood by one of ordinary skill in the art. One or more logical operations of embodiments of the present disclosure may be implemented as: (1) a sequence of computer implemented steps, operations, or procedures running on one or more general use programmable circuits, (2) a sequence of computer implemented steps, operations, or procedures running on one or more specific-use programmable circuits; and/or (3) interconnected machine modules or program engines within one or more general use and/or specific-use programmable circuits. One or more processors used to perform one or more steps and/or operations in accordance with embodiments of the present disclosure may also perform other functions, steps, and operations neither considered nor discussed herein (e.g., the one or more processors being multi-functional and/or capable of multi-tasking).

Depending on the embodiment of the present disclosure, some or all of the steps and/or operations may be implemented or otherwise performed, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, portable digital assistants (PDAs), mp3 players, handheld PCs, instant messaging devices (IMD), cellular telephones, global navigational satellite system (GNSS) receivers, watches, or any such device which can be worn and/or carried on one's person.

While certain embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method for a global navigation satellite system (GNSS) receiver, comprising:
    generating first coherent in-phase (I) correlations and first coherent quadrature (Q) correlations by summing coherent complex signal samples over a first time period;
    generating second coherent I correlations and second coherent Q correlations by summing the generated first coherent I correlations and the generated first coherent Q correlations over a second time period longer than the first time period;
    if there is no carrier phase lock, phase-rotating the second coherent I correlations and the second coherent Q correlations to align the second coherent I correlations and the second coherent Q correlations to a common reference plane; and
    generating third coherent I correlations and third coherent Q correlations by summing the generated second coherent I correlations and the generated second coherent Q correlations over a third time period longer than the second time period.

2. The method of claim 1, wherein phase-rotating the second coherent I correlations and the second coherent Q correlations to align the second coherent I correlations and the second coherent Q correlations to a common reference plane comprises:
    determining respective angles between each second coherent I correlation and corresponding second coherent Q correlations; and
    phase-rotating the second coherent I correlations and the second coherent Q correlations by the determined respective angles.

3. The method of claim 1, further comprising, before generating second coherent I correlations and second coherent Q correlations, at least one of:
    data stripping the first coherent I correlations and first coherent Q correlations; and
    data decoding the first coherent I correlations and first coherent Q correlations.

4. The method of claim 1, wherein the first time period is 20 msecs, the second time period is 100 msecs, and the third time period in 1 sec.

5. The method of claim 1, further comprising:
    generating signal energy amplitude values from the third coherent I correlations and the third coherent Q correlations.

6. The method of claim 5, further comprising:
    using the generated signal energy amplitude values for multipath mitigation.

7. The method of claim 5, further comprising:
    using the generated signal energy amplitude values for improving signal-to-noise ratio (SNR).

8. The method of claim 5, further comprising:
    using the generated signal energy amplitude values for detecting an earliest arriving energy peak.

9. The method of claim 5, further comprising:
    using the generated signal energy amplitude values for finding one or more power peak hypotheses in a search space.

10. The method of claim 5, further comprising:
    using the generated signal energy amplitude values for impairment metrics.

11. The method of claim 10, wherein the impairment metrics comprise at least one of NCR summations in continuous wave (CW) detection and cross correlation detection.

12. The method of claim 1, further comprising, before generating the second coherent I correlations and the second coherent Q correlations:
    determining whether a certain signal quality criteria is met.

13. The method of claim 12, wherein the certain signal quality criteria comprises at least one of carrier phase lock and carrier-signal-to-noise density (CNO).

14. The method of claim 1, wherein the received GNSS signal is at least one of a global positioning system (GPS) L1 C/A code signal, a GPS L1C code signal, and a GPS L5 code signal.

15. A global navigation satellite system (GNSS) receiver, comprising:
    one or more non-transitory computer-readable media; and
    at least one processor which, when executing instructions stored on one or more non-transitory computer readable media, performs the steps of:
        generating first coherent in-phase (I) correlations and first coherent quadrature (Q) correlations by summing coherent complex signal samples over a first time period;
        generating second coherent I correlations and coherent Q correlations by summing the generated first coherent I correlations and the generated first coherent Q correlations over a second time period longer than the first time period;
        if there is no carrier phase lock, phase-rotating the second coherent I correlations and the second coherent Q correlations to align the second coherent I correlations and the second coherent Q correlations to a common reference plane; and generating third coherent I correlations and third coherent Q correlations by summing the generated second coherent I correlations and the generated second coherent Q correlations over a third time period longer than the second time period.

16. The GNSS receiver of claim 15, wherein phase-rotating the second coherent I correlations and the second coherent Q correlations to align the second coherent I correlations and the second coherent Q correlations to a common reference plane comprises:

determining respective angles between each second coherent I correlation and corresponding second coherent Q correlations; and phase-rotating the second coherent I correlations and the second coherent Q correlations by the determined respective angles.

17. The GNSS receiver of claim 15, wherein the at least one processor, when executing instructions stored on one or more non-transitory computer readable media, performs, before generating second coherent I correlations and second coherent Q correlations, at least one of:

data stripping the first coherent I correlations and first coherent Q correlations; and data decoding the first coherent I correlations and first coherent Q correlations.

18. The GNSS receiver of claim 15, wherein the first time period is 20 msecs, the second time period is 100 msecs, and the third time period in 1 sec.

19. The GNSS receiver of claim 15, wherein the at least one processor, when executing instructions stored on one or more non-transitory computer readable media, performs the step of:

generating signal energy amplitude values from the coherent 1 sec I correlations and the coherent 1 sec Q correlations.

20. The GNSS receiver of claim 19, wherein the at least one processor, when executing instructions stored on one or more non-transitory computer readable media, performs the step of:

using the generated signal energy amplitude values for multipath mitigation.

* * * * *